United States Patent
Hata

(10) Patent No.: US 6,345,151 B1
(45) Date of Patent: Feb. 5, 2002

(54) LENS-FITTED FILM UNIT WITH IC MEMORY AND METHOD OF WRITING DATA IN IC MEMORY

(75) Inventor: Yukitsugu Hata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/343,260

(22) Filed: Jun. 30, 1999

(30) Foreign Application Priority Data

| Jun. 30, 1998 | (JP) | 10-184522 |
| Jun. 30, 1998 | (JP) | 10-184523 |
| Jul. 10, 1998 | (JP) | 10-196208 |

(51) Int. Cl.[7] .......................... G03B 17/02; G03B 7/26; G03B 17/24
(52) U.S. Cl. .................... 396/6; 396/206; 396/321
(58) Field of Search ..................... 396/6, 155, 176, 396/205, 206, 207, 208, 211, 310, 311, 315, 319, 321

(56) References Cited

U.S. PATENT DOCUMENTS 4,167,315 A * 9/1979 Nanba et al. ............... 396/318
4,332,445 A * 6/1982 Hosono ..................... 396/205
5,819,126 A * 10/1998 Kitagawa et al. ........... 396/319

* cited by examiner

Primary Examiner—David M. Gray
(74) Attorney, Agent, or Firm—Young & Thompson

(57) ABSTRACT

A lens-fitted film unit with an exposure mechanism which is equipped with a built-in flash and a pre-loaded film cartridge is provided with an IC memory in which exposure data is written, a write control IC operative to control writing data on an exposure in the IC memory, and a switch arrangement comprising a synchronizing switch which is actuated by a shutter blade of the exposure mechanism to cause the built-in flash to make a flash and an auxiliary switch which is actuated by operation of the shutter mechanism. The write control IC is actuated to control writing data on an exposure in the IC memory when at least one of the synchronizing and auxiliary switches is actuated during making the exposure. The built-in flash has a charge switch opetative to be turned on for charging a capacitor of the built-in flash and to remain turned on until turned off. The write control IC, which has a control terminal connected to the built-in flash and changeable between an interruption state in which charging the capacitor is interrupted and a permission state in which charging the capacitor is permitted turns the control terminal into the interruption state immediately after an exposure to write the exposure data in the IC memory during interruption of charging the built-in flash.

5 Claims, 12 Drawing Sheets

LENS-FITTED FILM UNIT WITH IC MEMORY AND METHOD OF WRITING DATA IN IC MEMORY

BACKGROUND OF THE INVENTION

1. Field of the Invention

The invention relates to a lens-fitted film unit in which data on exposure is written in an IC memory whenever an exposure is made and to a method of writing data on an exposure including an exposure date in an IC memory whenever an exposure is made.

2. Description of Related Art

Lens-fitted film units having been on the market which do not have the necessity for loading a film nor winding/rewinding the film after every exposure make one easily enjoy taking pictures. Such a lens-fitted film unit comprises a unit body with a simple exposure mechanism including a shutter installed therein and a film cartridge with a roll of unexposed filmstrip factory pre-loaded in the unit body. The unexposed filmstrip is unwound out from the film cartridge and wound into a film chamber after every exposure. When the maximum number of exposures available on the filmstrip are exposed and the filmstrip is completely wound up into the film chamber, the lens-fitted film unit is given to a photofinisher who first removes the film cartridge from the unit body to develop the negatives and makes an index print including all pictures and, if requested, individual regular prints from the negatives. On the other hand, the lens-fitted film unit without film cartridge is forwarded to the manufacturer for recycling. The developed filmstrip is reloaded in the film cartridge and returned together with the index print and regular prints to the customer. In recent years, one type of such lens-fitted film unit has an IC memory and write control IC means installed to either one of the unit body and the film cartridge for writing exposure data including a date of exposure whenever an exposure is made. As known from, for example, Japanese Unexamined Patent Publication No.9-204016 which describes a lens-fitted film unit of this kind, the exposure data are read out from the IC memory and used, for example, to print a date on a print or to make a panoramic print.

One type of lens-fitted film unit is equipped with a built-in electric flash unit. In this type of lens-fitted film unit has the necessity of having charged a capacitor of the electric flash unit to a prescribed charging voltage before making a flash exposure, which requires a charge switch which is turned on to charge the capacitor. In the case where the charge switch is of a slide type, in order to draw photographer's attention to turning off the charge switch, the charge switch is designed and adapted such that the charge switch at its external end is situated outside the exterior surface of the unit body when it is turned on. A lens fitted film unit of this type which is known from, for example, Japanese Unexamined Patent Publication No. 7-122389 is equipped with an electric flash unit which continuously charges the capacitor even when the charge switch is turned off after it has been turned on once and spontaneously interrupts charging the capacitor when having charged the capacitor to a prescribed charging voltage.

At the manufacturer, after loading the film cartridge in the unit body to complete a lens-fitted film unit, the write control IC means of the lens-fitted film unit is connected to an external computer by the aid of which the IC memory is initialized and base data including an initial date and time (year, month, day, hour, minute and second), the maximum number of exposures available on the filmstrip and an identification (ID) number of the lens-fitted film unit are written into the IC memory. When resetting the write control IC means through the computer, the write control IC means reads out the data on an initial date and time from the IC memory and sets the data on the initial date and time in a timer circuit which counts time from the initial time as a starting time and outputs data on a cumulative time indicating a lapse of time since the initial time. The write control IC means writes the cumulative time data in the IC memory in synchronism with an appearance of a signal generated whenever a synchronous switch is closed by a shutter blade actuated to make a flash exposure. During making prints, the data on these initial date and time and cumulative time for each exposure are read out from the IC memory and then added to each other as data on a date and time of the exposure which is used to print a date on a print.

The synchronous switch possibly fails in operation at rear intervals even when the shutter blade is actually operated with the result of causing a failure in writing data in the IC memory. If, after an occurrence of a failure in writing data on an instant exposure in the IC memory, it comes out successful to write data on another exposure in the IC memory, the data written in the IC memory is processed as data for the instant exposure. That is, there occurs inconsistency between a number of exposure and data on the exposure. This inconsistency causes an error that a wrong exposure date is printed on a print.

In the case where the electric flash unit is not of the type that spontaneously interrupts charging the capacitor, a built-in battery loses power as low as insufficient to charge the capacitor to the prescribed charging voltage in approximately five hours if a slide type charge switch is imprudently left turned on. Even in the case where the electric flash unit is of the type that spontaneously interrupts charging the capacitor, the built-in battery loses its power in approximately 100 hours if the slide type charge switch is imprudently left turned on. In either case, if the built-in battery exhausts its power before the maximum number of exposures available on the filmstrip have been exposed, it is impossible to write data on exposures in the IC memory.

When writing an initial date and time with the precision of a second or seconds in the IC memory, counting time with the precision of a second or seconds and writing a cumulative time with the precision of a second or seconds in the IC memory, the date and time printed on a print is accurate. However, if the lens-fitted film unit is left unused for a long period of time, the amount of data on a cumulative time becomes too large to be written in the IC memory. While this problem can be overcome by installing an IC memory having a large memory capacity, it causes an increase in cost of the lens-fitted film unit. Thereupon, when writing or counting the initial time, a lapsed time and a cumulative time with the precision of an hour, while the IC memory may have a small memory capacity, however, the date of exposure is possibly inaccurate because the cumulative time has an error of ±1 hour.

SUMMARY OF THE INVENTION

It is therefore an object of the invention to provide a lens-fitted film unit equipped with a built-in electric flash unit which certainly writes data on exposures in the IC memory even when a synchronous switch for causing the electric flash unit to make a flash fails in operation so as thereby to prevent an occurrence of inconsistency between an exposure and data on the exposure.

It is another object of the invention to a lens-fitted film unit equipped with a built-in electric flash unit which causes only a small loss in battery power even while a charge switch is imprudently left turned on and makes it reliable to write data on exposures in the IC memory.

It is a further object of the invention of the invention to provide a method of writing data on an exposure date which provides improved accuracy of an exposure date written in an IC memory and saves a memory capacity of the IC memory assigned to exposure dates.

According to one aspect of the invention, a lens-fitted film unit equipped with an exposure mechanism and a built-in electric flash unit comprises a film cartridge pre-loaded in the lens-fitted film unit, an IC memory installed to either one of the lens-fitted film unit and the film cartridge in which exposure data is written and write control IC means for controlling writing the exposure data in the IC memory, and switch means for causing the write control IC means to write the exposure data in the IC memory when actuated or turned on by the exposure mechanism during making an exposure. The switch means comprises a synchronizing switch which is actuated or turned on by a shutter blade of the exposure mechanism to cause the built-in electric flash unit to make a flash and an auxiliary switch which is actuated or turned on by operation of the shutter mechanism. The write control IC means is actuated to control or perform writing the exposure data in the IC memory when at least either one of the synchronizing switch and the auxiliary switch is actuated. In its simplest form, the auxiliary switch may be actuated by the shutter blade of the exposure mechanism during making an exposure.

In this embodiment, the construction of the switch means that actuation of at lest either one of the synchronizing switch and the auxiliary switch causes writing exposure data in the IC memory provides certainty of writing exposure data in the IC memory even if the synchronizing switch fails in operation for some reasons or other, which prevents an occurrence of inconsistency between an exposure and data on the exposure. The auxiliary switch constructed to be actuated by the shutter blade provides mechanical simplicity while providing certainty of writing exposure data in the IC memory.

In another aspect of the invention, the built-in electric flash unit has a charge switch which is actuated or turned on to charge a capacitor of the built-in electric flash unit and remains turned on until turned off, and the IC means has a charge control terminal which is connected to the built-in electric flash unit and changeable between an interruption state in which charging the built-in electric flash unit is interrupted and a permission state in which charging the built-in electric flash unit is permitted. The charge control terminal is turned into the interruption state immediately after an exposure to write data of the exposure in the IC memory during interruption of charging the built-in electric flash unit. The charge control terminal is turned into the interruption state at a lapse of a specified time which is counted by a timer of the IC means, which is actuated in response to actuation of the charge switch, while the charge switch remains turned on.

According to the embodiment, charging the built-in electric flash unit is interrupted by turning the charge control terminal of the IC means into the interruption state when a specified time lapses while the charge switch is left turned on, which makes a lose of battery power as small as possible even while the charge switch is imprudently or accidentally left turned on and guarantees to write exposure data whenever an exposure is made. The charge switch may be of a slide type which provides mechanical simplicity and makes a reduction in cost of the lens-fitted film unit.

In another aspect of the invention, the method of writing data on an exposure date in the IC memory installed to either one of a lens-fitted film unit with an exposure mechanism and a film cartridge pre-loaded in the lens-fitted film unit comprises the steps of writing data on an initial date and time as a starting time with the precision of a second or seconds in the IC memory at shipping of the lens-fitted film unit, counting a cumulative time from the starting time with the precision of a second or seconds, and writing data on the cumulative time since the starting time with the precision of an hour in the IC memory whenever an exposure is made.

Performing both writing initial date and time and counting time with the precision of a second or seconds provides improved accuracy of an exposure date and prevents an error of ±1 hour which is possibly caused in the case where counting time with the precision of an hour with discarding minutes and seconds. Further, the capacity of the IC memory assigned to exposure dates is saved.

BRIEF DESCRIPTION OF THE DRAWINGS

The accompanying drawings, which are incorporated in and construe part of the specification, illustrate the preferred embodiments of the invention. In the drawings parts or mechanisms denoted by the same or like reference numerals are same in structure and operation. It is to be understood, of course, that both drawings and the description are explanatory only and are not restrictive of the invention.

DETAILED DESCRIPTION OF THE PREFERRED EMBODIMENTS

Figure 1:
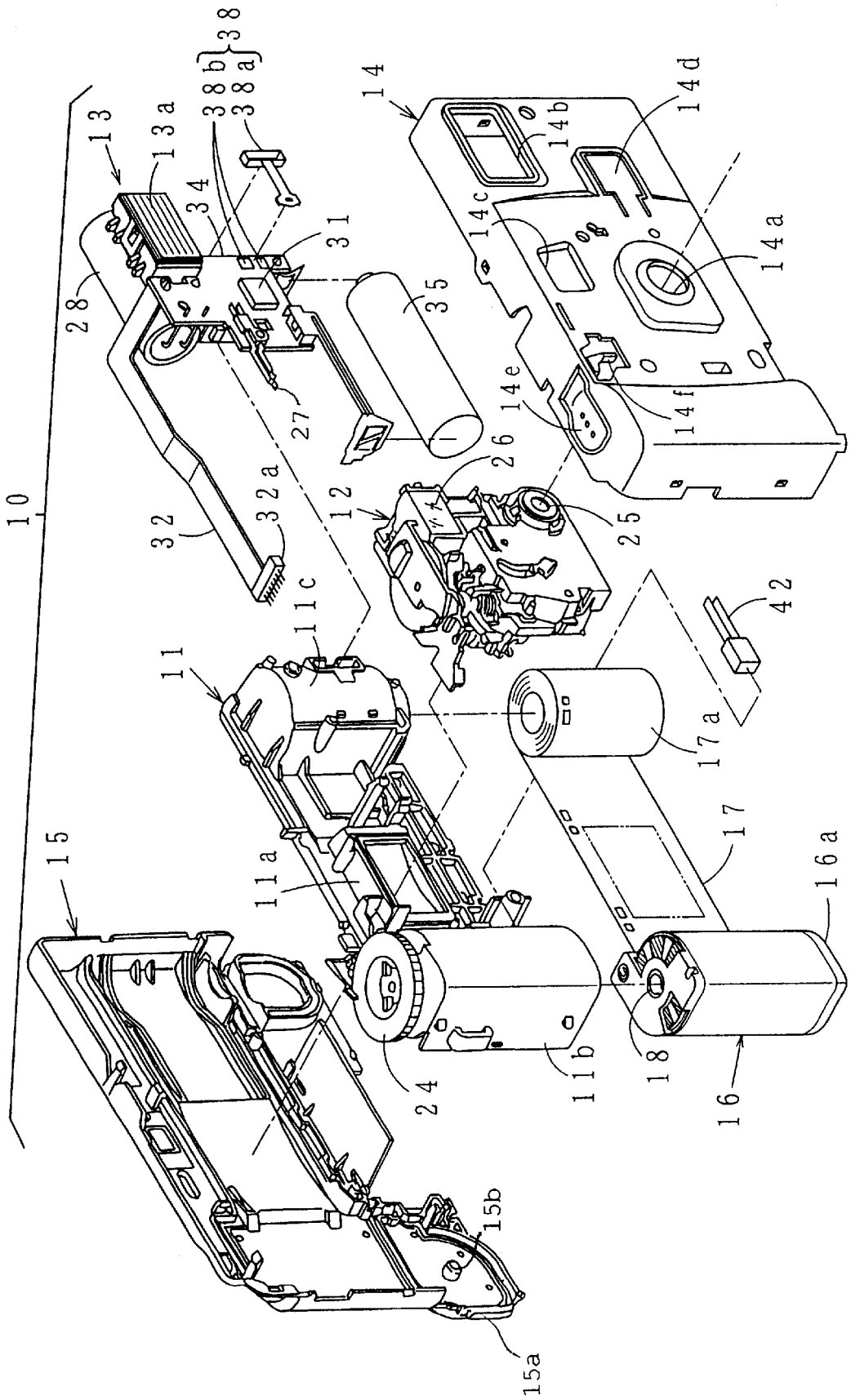
FIG. 1 is an exploded perspective view of a lens-fitted film unit in accordance with an embodiment of the invention.

Referring to the accompanying drawings in detail and, in particular, to FIG. 1 which is an exploded perspective view showing a lens-fitted film unit 10 in accordance with an embodiment of the invention, the lens-fitted film unit 10 has a unit casing comprising a main unit body 11 and front and rear case sections 14 and 15. The front and rear case sections 14 and 15 are mating shaped for assembly into one box-shaped light-tight case in which the main body section 11 is installed. The main body section 11 has a cartridge receiving chamber 11b for a film cartridge 16 (which will be described in detail later) located proximate one end side of an exposure frame aperture 11a and a roll film supporting chamber 11c for an unexposed film roll 17a located proximate another end side of the exposure frame aperture 11a. The main body section 11 is provided with a film advance thumbwheel 24 on the top wall of the cartridge receiving chamber 11b. An integral spool driver (not shown) integrally formed with the film advance thumbwheel 24 projecting into the cartridge receiving chamber 11b is rotated in a counterclockwise direction as viewed in FIG. 1 in engagement with a key groove 18a (see FIG. 2) at the top of a film spool 18, by the film advance thumbwheel 24, to rewind successive exposed frames of the filmstrip 17 into the film cartridge 16. Installed to the exposure frame aperture 11a from the front is an exposure unit 12 which is provided with a taking lens 25 and a viewfinder optical system 26 consisting of an eyepiece and an objective as well as a shutter charge mechanism, a film winding stop mechanism, an exposure counter mechanism and a shutter drive mechanism including a shutter blade 40 (see FIG. 3). These mechanisms, which are not shown in the figure, are well known in various forms to those skilled in the art and may take any known forms. The front case section 14 at its front wall is provided with an opening 14a in which the taking lens 25 is situated, an opening 14b in which an flash discharge window 13a of a built-in electronic flash unit 13 is situated, an opening 14c as a viewfinder window for viewing a subject to be photographed through the view finder optical system 26 and a flexible switch button 14d formed as an integral part of the front wall which is operated to charge a main capacitor 28 of the built-in electronic flash unit 13. The front case section 14 at its top wall is provided with a flexible shutter button 14e formed as an integral part of the top wall. When the shutter button 14e is depressed, it forces an actuator 14f to actuate the shutter drive mechanism for exposure.

The built-in electronic flash unit 13 comprises a flash discharge tube (not shown) behind the flash discharge window 13a, a synchronous switch 27, an auxiliary switch 48 and an electronic flash circuit 29 (see FIG. 4) including the main capacitor 28. Installed to the built-in electronic flash unit 13 is a printed circuit board 34 on which a data record circuit 33 (see FIG. 4) is printed. The printed circuit board 34 is provided with a write control IC 31 in the form of a chip attached thereto and a flexible wiring cable 32 leading from the data record circuit 33. A battery 35 having a voltage of VI, such as a 1.5 volts unit III type battery, is installed to the built-in electronic flash unit 13 as a power source for both electronic flash circuit 29 and data record circuit 33. A charge switch 38 operative to charge the main capacitor 28 when it turns on comprises an elastic metal contact 38a which is installed to the outer wall of the roll film supporting chamber 11c and a pair of fixed contacts 38b secured to the printed circuit board 34. When the flexible switch button 14d is depressed, it bends and brings the elastic metal contact 38a into contact with the fixed contacts 38b to turn on the charge switch 38. As shown in detail in FIG. 3, the synchronous switch 27 comprises a pair of elastic metal contacts 27a and 27b arranged on upper and lower sides with a space therebetween. The auxiliary switch 42 comprises a pair of elastic metal contacts 42a and 42b arranged on upper and lower sides with a space therebetween and secured to the outer wall of the roll film supporting chamber 11c and is disposed in the course of movement of the bottom of the shutter blade 40. When the shutter blade 40 is actuated to completely open the exposure aperture 40a, it hits and bends the upper elastic metal contacts 27a and 42a to bring them into contact with the lower elastic metal contacts 27b and 42b, respectively. The auxiliary switch 42 is closed to actuate the data record circuit 33 normally whenever the synchronous switch 27 does not normally operate due to poor contact or damage when the shutter is actuated so that data on exposure for an exposed flame is certainly written in an IC memory 22 (see FIG. 2). The flexible wiring band 32 at its end has a plug 32a with a plurality of connector pins which are connected to a connector (not shown). This connector is installed to the top wall of the cartridge receiving chamber 11b and electrically connected to connecting pins which are exposed to the inside of the cartridge receiving chamber 11b and connected to a contact segment 23 of the film cartridge 16 (see FIG. 2) to provide electric connection between the write control IC 31 and the IC memory 22. The rear case section 15 has a bottom lid 15b for closing a bottom opening of the cartridge receiving chamber 11b and a bottom lid 15c for closing a bottom opening of the film roll supporting chamber 11c. Projecting from the bottom lid 15b is a boss 15d for supporting the lower end of the film spool 18 of the film cartridge 16.

Figure 2:
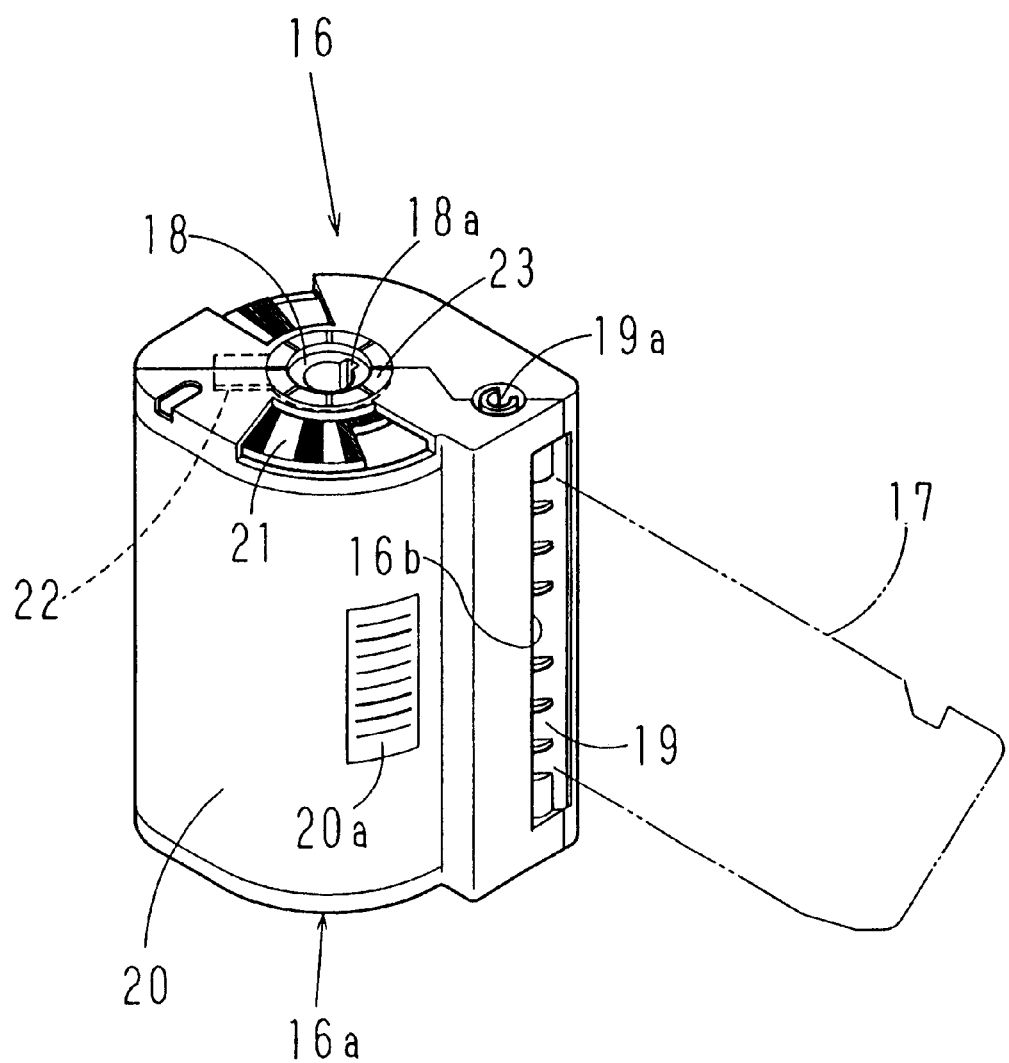
FIG. 2 is a view of a film cartridge which is loaded in the lens-fitted film unit shown in FIG. 1.
Figure 3:
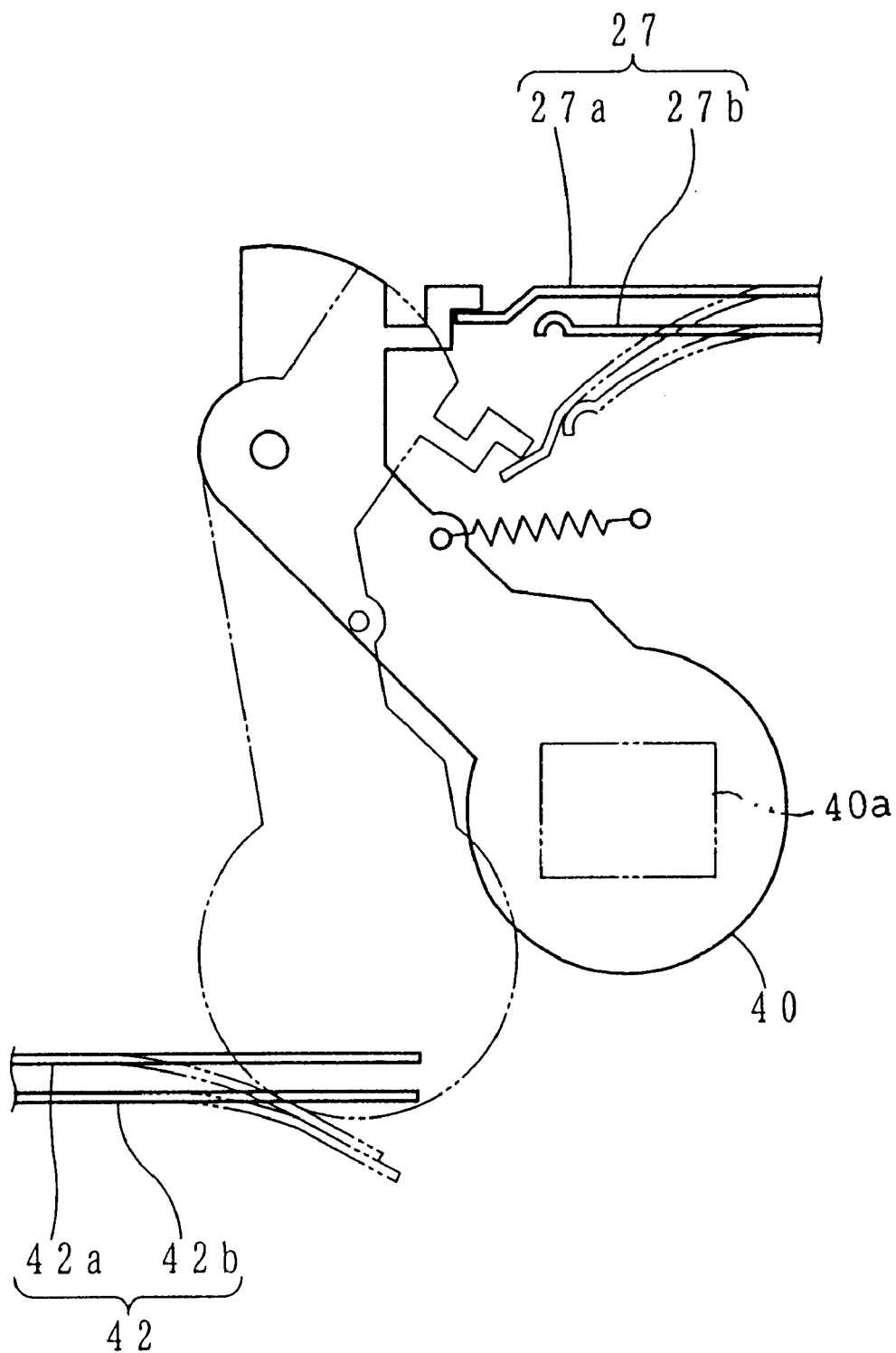
FIG. 3 is a schematic illustration showing the positional relationship of a synchronous switch and an auxiliary switch with respect to a shutter blade.

FIG. 2 shows details of the outer appearance of the film cartridge 16 of the APS (Advanced Photo System) type which contains a roll of filmstrip 17 with an emulsion layer formed on one side surface thereof and a transparent magnetic recording layer formed on another side surface thereof. The film cartridge 16 comprises a generally cylindrically-shaped cartridge shell 16a, a film spool 18 rotatable inside the cartridge shell 16a in opposite film unwinding and film winding directions to unwind the filmstrip 17 off the film spool 18 and to wind the filmstrip 17 onto the film spool 18, a light block door 19 rotated closed to prevent light from entering the interior of the cartridge shell 16a through a film egress/ingress slot 16b and rotated open to permit the filmstrip 17 to move into and out of the interior of the cartridge shell 16a via the film egress/ingress slot 16b. The film spool 18 at its opposite ends are exposed to the exterior of the cartridge shell 16a and formed with key grooves 18a, respectively. The light block door 19 at its opposite ends are formed with key grooves 19a, respectively, which are exposed to the exterior of the cartridge shell 16a and engageable by a rotational light block door drive (not shown) installed in the main body section 11 to be rotated from an open position to a closed position after the filmstrip 17 is completely rewound into the cartridge shell 16a following the last exposure. While the light block door 19 is in the open position, forcible rotation of the film spool 18 in the clockwise direction as viewed in FIG. 2 causes movement of the filmstrip 17 out of the cartridge shell 16a through the via the film egress/ingress slot 16b so as to position the first flame in the exposure frame aperture 11a.

The film cartridge 16 has a bar-code label 20 secured to the cartridge shell 16a and a bar-code disk 21 coaxially fixed to the film spool 18 to be rotated with the film spool 18. The bar-code label 20 is printed with a bar-code 20a indicating a cartridge identification (ID) number of the film cartridge 16. A film identification number is recorded as a latent image of a bar-code on the emulsion layer of the filmstrip 17 and, if necessary, as a magnetic signal on the magnetic recording layer of the filmstrip 17 when the filmstrip 17 is produced. The bar-code disk 21 is readable by a bar-code reader of, for example, a printer to provide data including the type of the filmstrip 17 and the maximum number of exposures available on the filmstrip 17.

In order to record exposure data on the magnetic layer of the filmstrip 17, the lens-fitted film unit or a conventional camera has the necessity of a magnetic recording device including a magnetic recording head and a head driving circuit installed therein. However, since the magnetic recording device is expensive, a low cost type of popular camera or a single-use camera such as a lens-fitted film unit is hard in view of costs to be provided with the magnetic recording device and is impossible to make use of the advantageous features of the Advanced Photo System. Therefore, the film cartridge 16 is provided with an IC memory 22 in the cartridge shell 16a and electrically connected by, for example, wire bonding, to a contact segment 23 secured to the film spool 18 and exposed to the exterior of the cartridge shell 16a and which stores data on details of exposures and dates of the exposures thereon. The IC memory 22 takes the form of an electrically erasable programmable read-only memory (EEPROM) which has no necessity of using a battery for storage. The IC memory 22 can be used to store data including the type of the filmstrip 17 and the maximum number of exposures available on the filmstrip 17. In such a case, the film cartridge 16 may not be provided with the bar-code disk 21. At a photofinisher, the data are read out and magnetically recorded on the magnetic layer of the filmstrip 17 to be used as exposure correction data during making prints from the negatives by the use of an advanced photo system type of photo processor.

At the manufacturer, after writing data relating to a lens-fitted film unit 10 (LF ID data) into which the film cartridge 16 is loaded, the date of manufacture, an initialized time, a film ID number of the filmstrip 17 and the like at specified address areas in the IC memory 22, respectively, the film cartridge 16 in the lens-fitted film unit 10 is loaded in the lens-fitted film unit 10. The initialized time is a starting time from which a cumulative time is counted by the write control IC 31.

Figure 4:
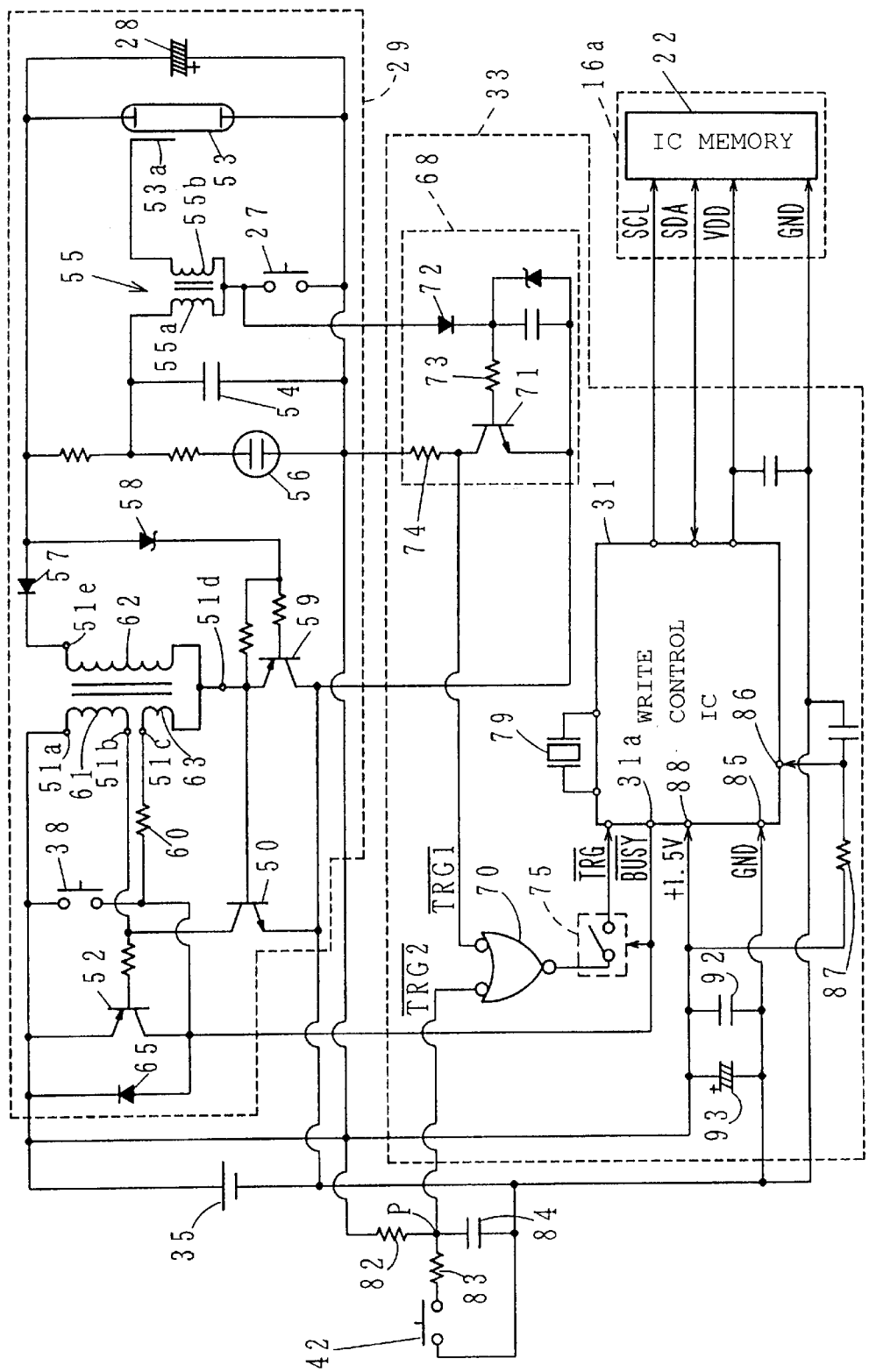
FIG. 4 is a circuit diagram showing a circuit installed in the lens-fitted film unit.

FIG. 4 shows a circuit diagram installed in the lens-fitted film unit 10. As shown, the electronic flash circuit 29 comprises an NPN type of oscillation transistor 50, an oscillation transformer 51, a PNP type of latch transistor 52, an electric discharge tube (Xe tube) 53, a trigger capacitor 54, a trigger transformer 55, a neon lamp 56, a charge diode 57 for charging the main capacitor 28, a Zener diode 58 and a PNP type of charge interruption transistor 59 in addition to the synchronous switch 27, the main capacitor 28 and the charge switch 38. The NPN oscillation transistor 50 and the oscillation transformer 51 form a known type of blocking oscillation circuit which converts a low voltage of the battery 35 to a high voltage and charges the main capacitor 28 with the high voltage. When the charge switch 38 is turned on, the NPN oscillation transistor 50 receives a charge signal. Specifically, the oscillation transistor 50 is supplied with a base current from the battery 35 through a tertiary coil 63 of the oscillation transformer 51 and a resistance 60 to turn conductive so as thereby to permit a flow of collector current through a primary coil 61 of the oscillation transformer 51, and then amplifies the collector current with an increase in the base current due to positive feedback operation through the oscillation transformer 51 to oscillate. The latch transistor 52 supplies a feedback base current to the oscillation transformer 51 to cause the oscillation transformer 51 to continue oscillatory operation even when the charge switch 38 is subsequently turned off. Specifically, when the oscillation transistor 50 has started its oscillatory operation once, the latch transistor 52 receives part of the collector current to the oscillation transistor 50 at the base thereof and turns conductive, so that the collector current flowing through the latch transistor 52 is supplied as the feedback base current to the oscillation transistor 50 even when the charge switch 38 is turned off. As will be described later, even while the charge switch 38 remains turned off, when a busy signal (*BUSY) appealing from the write control IC 31 is at a high level, the busy signal (*BUSY) is sent as a charge signal to the oscillation transistor 50 and causes it to continue oscillatory operation through the positive feedback operation of the latch transistor 52. The symbol "*BUSY" as used herein is substituted for a label "BUSY" accompanied by an upper line in FIG. 4 and signifies that the busy signal, which is electromotive force, is negative and the symbols "*TRG1", "*TRG2" and "*TRG" as used herein are substituted for labels "TRG1", "TRG2" and "TRG" accompanied by an upper line, respectively, in FIG. 4 and signify that trigger signals "TRG1", "TRG2" and "TRG," which are electromotive force, are negative. A diode 65, which is connected at its anode to the tertiary coil 63 of the oscillation transformer 51 via the resistance 60 and connected at its cathode to the battery 35 at the plus side, forms a current loop (an escape route) for counter electromotive force which is generated at the tertiary coil 63 of the oscillation transformer 51 while the charge switch 38 remains turned off, so as to prevent oscillatory operation of the blocking oscillation circuit from becoming unstable and a charge time of the main capacitor 28 from becoming long. High voltage electromotive force of e.g. approximately 300 volts is generated at a secondary coil 62 of the oscillation transformer 51 according to a winding ratio between the primary and secondary coils 61 and 62 while the oscillation transistor 50 oscillates. The charge diode 57 permits a secondary side current caused in the presence of the electromotive force to be supplied to the main capacitor 28 which is connected to the opposite electrodes of the discharge tube 53 and also connected at plus and minus sides to the minus and plus terminals of the battery 35, respectively. In consequence, the main capacitor 28 is charged such that an electric potential at the minus side of the main capacitor 28 is lower than an electric potential at the plus side of the battery 35 which is taken as a reference electric potential. In the case where the main capacitor 28 has a prescribed charging voltage Va, e.g. 300 volts, when a charging voltage Vc reaches the prescribed charging voltage Va, the discharge tube 53 generates a specified amount of flash light. The trigger capacitor 54 is charged with a secondary side current while the main capacitor 28 is charged and discharged in response to a turn of the synchronous switch 27 to the on-state which is caused by actuation of the shutter. The discharged electricity flows through a primary coil 55a of the trigger transformer 55, which is accompanied by an appearance of a high voltage of, for example, 4 K volts as a trigger voltage at a secondary coil 55b of the trigger transformer 55. The trigger voltage is delivered to the discharge tube 53 through a trigger electrode 53a disposed in close proximity to the discharge tube 53. As a result, the Xe gas in the discharge tube 53 is ionized to cause the main capacitor 28 to be discharged, so that the discharge tube 53 is triggered to make a flash. The neon lamp 56 goes up when a charging voltage Vc of the main capacitor 28 reaches a specified charging voltage Vb and then causes the trigger capacitor 54 to be discharged. The neon lamp 56 goes out when the voltage supplied to the neon lamp 56 drops. However, since the trigger capacitor 54 is in connection with the oscillation transistor 50 and is continuously charged while the oscillation transistor 50 oscillates, the neon lamp 56 goes up again resulting from a rise in charging voltage Vc of the trigger capacitor 54. Therefore, the neon lamp 56 starts to go on and off immediately before the main capacitor 28 attains the prescribed charging voltage Va on a frequency which is made high or shortened as the charging voltage Vc of the main capacitor 28 rises. The neon lamp 56 is seen in a window formed in the rear case section 15 in close proximity to the viewfinder eyepiece to effect an indication that the built-in electronic flash unit 13 is ready to make a flash. While the specified charging voltage Vb is preferred to be equal to the prescribed charging voltage Va, it is actually approximately 280 volts which is slightly lower than the prescribed charging voltage Va. Therefore, a flash exposure is made after the frequency on which the neon lamp 56 goes on and off has become sufficiently short.

The Zener diode 58 and the charge interruption transistor 59 cooperate to interrupt charging the main capacitor 20 through the electronic flash circuit 29 when the main capacitor 28 is charged to its prescribed charging voltage Va. The Zener diode 58 which has a Zener voltage equal to the prescribed charging voltage Va of the main capacitor 28, i.e. 300 volts, is used in the electronic flash circuit 29. When the main capacitor 28 is charged to the prescribed charging voltage Va, the same voltage is supplied to the Zener diode 58 to admit a Zener current flow through the Zener diode 58 in the opposite direction. The Zener current is supplied as a base current to the charge interruption transistor 59 to turn it conductive. As a result, the oscillation transistor 50 is short-circuited between its base and emitter to interrupt oscillatory operation. As a result, the latch transistor 52 turns nonconductive to interrupt the oscillatory operation of the blocking oscillation circuit and the charging of the main capacitor 28. In place of using the Zener diode 58 and the charge interruption transistor 59 to interrupt charging of the main capacitor 28, it is possible to interrupt charging of the main capacitor 28 by turning a busy signal into an L level (which will be described later) when attainment of the prescribed charging voltage Va of the main capacitor 28 is detected based on a potential change caused in the electronic flash circuit 29 or a change in oscillation frequency of the electronic flash circuit 29.

The data record circuit 33 comprises a trigger detection circuit 68, a crystal oscillator 79 and a NOR circuit 70 in addition to the write control IC 31. The trigger detection circuit 68, which monitors completion of an exposure, includes an NPN type of transistor 71 and a diode 72 as essential components. The diode 72 is used to prevent the transistor 71 from being supplied with a counter voltage due to which the transistor 71 is possibly damaged or broken and has an anode which is connected between the synchronous switch 27 and the trigger transformer 55 and a cathode which is connected to the base of the transistor 71 through a resistance 73. The transistor 71 with its collector connected to the battery 35 at the plus side through a resistance 74 turns conductive and nonconductive in response to turning on and off of the synchronous switch 27, respectively. Specifically, while the synchronous switch 27 remains turned off, the transistor 71 is kept from being supplied with a base current and remains nonconductive, so that the transistor 71 applies a positive potential appearing at its collector as a trigger detection signal "*TRG1" at a high level (which is referred to as an H level and takes 1.5 volts), i.e. the battery potential, to one of input terminals of the NOR circuit 70. On the other hand, when the synchronous switch 27 turns on in response to actuation of the shutter, the transistor 71 is supplied with a base current to turn conductive, so that the potential appearing at its collector as the trigger detection signal "*TRG1" drops to a low level (which is referred to as an L level and takes 0 volt). The NOR circuit 70 at another one of the input terminals is connected to a juncture P between two resistances 82 and 83 which are connected in series to the battery 35. The resistance 83 and a capacitor 84 are connected in series to the auxiliary switch 42 to prevent the auxiliary switch 42 from chattering. The auxiliary switch 42, which is connected between the resistance 82 and the battery at the minus side, turns on and off to change a potential appealing at the juncture P between the H and L levels. The potential appearing at the juncture P is supplied as a trigger detection signal "*TRG2" to the other input terminal of the NOR circuit 70. Specifically, while the auxiliary switch 42 remains turned off, the NOR circuit 70 at the other input terminal is brought into connection to the battery 35 at the plus side to be supplied with a trigger detection signal "*TRG2" at the H level. On the other hand, when the auxiliary switch 42 turned on, the potential at the juncture P as a trigger detection signal "*TRG2" to the NOR circuit 70 drops to the L level. When the NOR circuit 70 at least one of the input terminals is supplied with a trigger detection signal at the L level, it provides a trigger signal "*TRG" at the L level which is sent to and written into the write control IC 31 through a write control switch 75. The write control switch 75 is caused to turn off with a busy signal which appears at a busy signal output terminal 31a (which will be described later) of the write control IC 31 after the write control IC 31 has received the trigger detection signal "*TRG." Therefore, when the trigger detection signals "*TRG1" and "*TRG2" do not simultaneously turn into the L level, the write control IC 31 is prevented from being supplied with a trigger signal "*TRG" at the L level which is provided by the NOR circuit 70 due to a presence of either one of the trigger detection signals "*TRG1" and "*TRG2" which turns into the L level later than the other, so as to prevent same data from being written into the IC memory 22 twice. The write control switch 75 is turned on when the busy signal turns into the H level after completion of writing data in the IC memory.

The write control IC 31 has a terminal GND 85 which is connected to the battery 35 at the ground (minus) side, a Vcc1 terminal 86 which is connected to the battery 35 at the plus side through a resistance 87 and a Vcc2 terminal 88 which is connected directly to the battery 35 at the plus side. The write control IC 31 remains active in the presence of a driving voltage VCC1 (e.g. approximately 1.0 volt) at the Vcc1 terminal to control counting a cumulative time and writing data into the IC memory 22. Further, the write control IC 31 includes a voltage double circuit 91 (see FIG. 5) which boosts a voltage VCC2 (1.5 volts=V1) supplied to the Vcc2 terminal 88 from the battery 35 to a driving voltage VDD (3 volts) and supplies the driving voltage VDD to the IC memory 22 to drive it.

The data record circuit 33 is provided with first and second capacitors 92 and 93 arranged in parallel between power lines leading to the battery 35 and the write control IC 31. These first and second capacitors 92 and 93 cooperate with the resistance 87 to absorb electric noises caused in the power lines due to discharge of the main capacitor 28 through the discharge tube 53 and ripple noises (fluctuating voltage components) caused in the power lines while the main capacitor 28 is charged, so as to work as a filtering circuit to prevent the write control IC 31 from causing operational errors.

Figure 5:
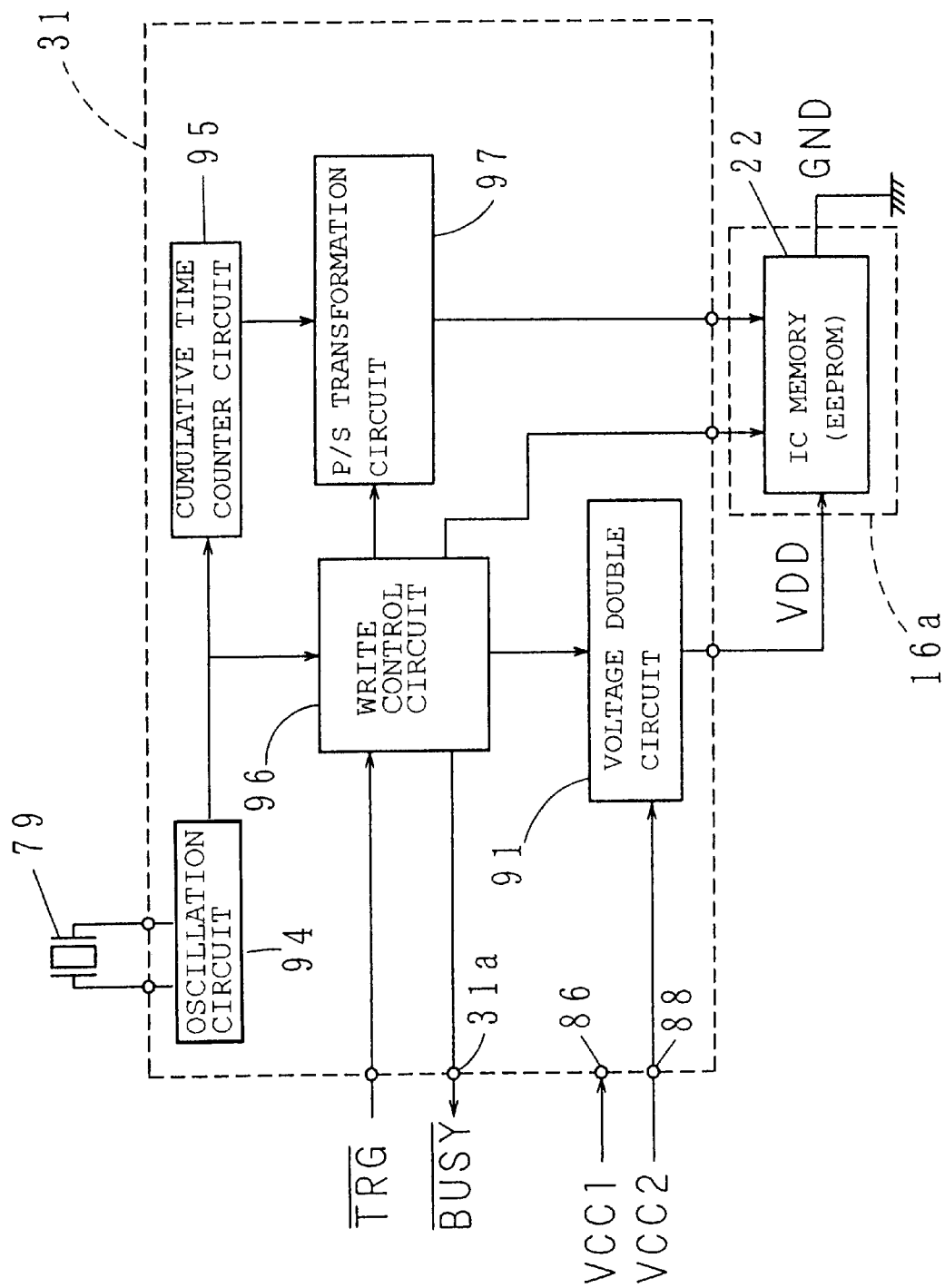
FIG. 5 is a block diagram schematically showing a write control IC of the circuit shown in FIG. 4.

FIG. 5 shows a circuit structure of the write control IC 31 in block diagram. As shown, the write control IC 31 includes an oscillation circuit 94, a cumulative time counter circuit 95, a write control circuit 96 and a parallel/serial (P/S) transformation circuit 97 in addition to the voltage double circuit 91 which are integrated as a single IC chip. These circuits excepting the voltage double circuit 91 are driven with a driving voltage VCC1 appearing at the Vcc1 terminal 86. The write control IC 31 includes a circuit (not shown) to write basic data in the IC memory 22 of the film cartridge 16 and initialize the cumulative time counter circuit 95 by the aid of an external computer. The oscillation circuit 94 cooperates with the crystal oscillator 79 to generate a clock on a fixed frequency. The cumulative time counter circuit 95 cumulatively counts a time from the starting time written in the IC memory 22 based on the clock and sends data on the cumulative time to the parallel/serial (P/S) transformation circuit 97. The write control circuit 96, which acts at a timing based on the clock and is supplied with a trigger detection signal "*TRG" from the NOR circuit 70, has an address counter whose content is renewed with an address of the IC memory 22 (which corresponds to an exposure frame number of the filmstrip) at which data on a subsequent exposure are written whenever data on the latest exposure have been written. The parallel/serial (P/S) transformation circuit 97, which is controlled by the write control circuit 96, transforms exposure data including the cumulative time data at a moment of an appearance of the trigger detection signal "*TRG" at the write control circuit 96 into serial data (SDA) and sends it to the IC memory 22 in synchronism with a synchronizing clock (SCL) provided by the write control circuit 96 and then writes them in the IC memory 22. The serial exposure data (SDA) is written in the IC memory 22 at an address corresponding to an exposure frame number indicated on the address counter of the write control circuit 96.

Since the battery 35 causes a voltage drop due to a large amount of current flow through the electronic flash circuit 29 which is accompanied by a drop in driving voltage VDD to be supplied to the IC memory 22 while the electronic flash circuit 29 charges the main capacitor 28, the IC memory 22 possibly fails in writing exposure data therein or possibly writes wrong exposure data therein. Therefore, the write control IC 31 is provided with the busy signal output terminal 31a as a charge control terminal which is controlled in its state by the write control circuit 96 so as to prohibit the electronic flash circuit 29 from charging the main capacitor 28 while it writes exposure data in the IC memory 22. The busy signal output terminal 31a, which is of the type of three state terminal well known in the art which can change itself into a high impedance state as well as outputting a busy signal "*BUSY" at the H level or at the L level therefrom, leads to the latch transistor 52 at the collector, i.e. to the base of the oscillation transistor 50 through the resistance 60 and the tertiary coil 63 of the oscillation transformer 51, of the electronic flash circuit 29.

The write control circuit 96 turns the busy signal into the L level by changing the busy terminal 31a to a state in which the electronic flash circuit 29 is prohibited from charging the main capacitor 28 when a trigger detection signal "*TRG" appears. As a result, a current flow to the base of the oscillation transistor 50 is interrupted to prohibit the electronic flash circuit 29 from charging the main capacitor 28. During the prohibition of charging the main capacitor 28, the exposure data is written in the IC memory 22. In response to completion of the write of the exposure data in the IC memory 22, the write control circuit 96 turns the busy signal into the H level for a specified period of time by changing the busy terminal 31a to a state in which the electronic flash circuit 29 starts charging the main capacitor 28. In consequence, the busy signal at the H level is supplied as a charge signal to the oscillation transistor 50 to start charging the main capacitor 28. Thereafter, the busy terminal 31a is changed into the high impedance state. While the busy terminal 31a remains in the high impedance state, the oscillation transistor 50 is permitted to oscillate.

In operation of the lens-fitted film unit 10, the write control IC 31 is placed under operation by fixedly installing a battery 35 in the lens-fitted film unit 10 at the manufacturer and remains operative since shipment. Before making the first flash exposure, the switch button 14d is depressed to turn on the charge switch 38. Because the busy terminal 31a of the write control IC 31 is in the high impedance, the oscillation transistor 50 at the base is supplied with a current from the battery 35 through the resistance 60 and the tertiary coil 63 of the oscillation transformer 51 in response to turning on the charge switch 38, and then starts oscillatory operation to cause a collector current according to the base current into the collector. The collector current flows as a primary side current through the primary coil 61 of the oscillation transformer 51 in a direction from a first terminal 51a to a second terminal 51b. As the primary side current increases, the oscillation transformer 51 generates high voltage electromotive force at the secondary coil 62 which causes a secondary side current flow in a direction from a fifth terminal 51e to a fourth terminal 51d. The secondary side current is supplied as a base current to the oscillation transistor 50 to increase further the collector current (primary side current) flowing through the primary coil 61. When the oscillation transistor 50 is caused to allow a collector current flow, the latch transistor 52 at the base is supplied with the collector current as a base current, so as to turn conductive to supply a base current to the oscillation transistor 50 from the battery 35 through the resistance 60 and the tertiary coil 63 of the oscillation transformer 51. The oscillation transistor 50 amplifies the collector current as the primary side current by the aid of the base current amplified through the positive feedback operation of the latch transistor 52. When the oscillation transistor 50 is nearly saturated, it makes an increase in the collector current, i.e. the primary side current, small. In consequence, the oscillation transformer 51 generates counter electromotive force at each of the primary to tertiary coils 61 to 63 with an effect of sharply dropping the base current to the oscillation transistor 50 through the secondary coil 62, so as to drop sharply the collector current flowing through the oscillation transistor 50. Since the oscillation transistor 50 is supplied with the base current through the latch transistor 52, it does not turn completely nonconductive. Therefore, after the oscillation transformer 51 has terminated generation of counter electromotive force, the oscillation transistor 50 causes an increase in the collector current as the primary side current, so as to continue oscillatory operation.

The secondary side current, which is caused as a result of generation of high voltage electromotive force at the secondary coil 62 of the oscillation transformer 51 during the oscillatory operation, is supplied to both main capacitor 28 and trigger capacitor 54 through the charge diode 57 to charge them. As the main capacitor 28 is progressively charged, it increases a charging voltage Vc. When the main capacitor 28 attains the specified charging voltage Vb (approximately 252 volts), the neon lamp 56 repeatedly goes on and off. As charging the main capacitor 28 progresses further and when it attains the prescribed charging voltage Va, the Zener diode 58 admits a Zener current flow, which is accompanied by turning the charge interruption transistor 59 conductive. When the charge interruption transistor 59 turns conductive, the oscillation transistor 50 is short-circuited between the base and emitter to interrupt oscillatory operation. In consequence, the latch transistor 52 turns nonconductive to interrupt charging the main capacitor 28. Since the charge switch 38 and the latch transistor 52 are off or nonconductive, the oscillation transistor 50 does not resume oscillatory operation even when the charge interruption transistor 59 turns conductive resulting from interruption of the Zener current to the Zener diode 58. Accordingly, when the main capacitor 28 attains the prescribed charging voltage Va, charging the main capacitor 28 is terminated.

When it is ascertained by means of flashing on and off of the neon lamp 54 on a high frequency that the built-in electronic flash unit 13 has been placed ready for use, the shutter button 14e is depressed to make an exposure. The depression of the shutter button 14e actuates the shutter blade 40 to open the exposure aperture 40a. At a moment that the shutter blade opens entirely the exposure aperture 40a, the shutter blade 40 hits both synchronous switch 27 and auxiliary switch 42 substantially simultaneously to turn them on. In the case where the lens-fitted film unit 10 is left unused for a long period of time, the main capacitor 28 is spontaneously discharged to cause a drop in charging voltage Vc. If the main capacitor 28 causes a drop in charging voltage Vc as large as the built-in electronic flash unit 13 is hard to make a flash or to provide an intended amount of flash light, the charge button 14d is depressed to turn on the charge switch 38, so as thereby to recharge the main capacitor 28 until the prescribed charging voltage Va is attained. In response to the turn on of the synchronous switch 27, whenever the main capacitor 28 keeps a charging voltage Vc necessary for built-in electronic flash unit 13 to make a flash, the trigger capacitor 54 is discharged to cause the trigger transformer 55 to generate a trigger voltage which is supplied to the discharge tube 53 through the trigger electrode 53a. In consequence, the main capacitor 28 is discharged to trigger the discharge tube 53 to make a flash. If the main capacitor 28 is short of charging voltage Vc, the discharge tube 53 is not triggered. The trigger transistor 71 is turned conductive following the turn on of the synchronous switch 27 to turn the trigger detection signal "*TRG1" into the L level. Further, the auxiliary switch 42 is turned on substantially simultaneously with the turn on of the synchronous switch 27 to turn the trigger detection signal "*TRG2" into the L level. At this time, even if the synchronous switch 27 does not turn on for some reasons, the auxiliary switch 42 is certainly turned on, the NOR circuit 70 provides a trigger detection signal "*TRG" at the L level and sends it to the write control circuit 96. At the moment of receiving the trigger detection signal "*TRG," the write control circuit 96 causes the busy signal "BUSY" to turn into the L level. In consequence, the oscillation transistor 50 is shut off from supply of a base current to prevent the electronic flash circuit 29 from charging the main capacitor 28. Simultaneously, the write control switch 75 is turned off with the busy signal. As a result, if both synchronous switch 27 and auxiliary switch 42 are turned on at different timings, the trigger detection signal "*TRG" which is provided by the NOR circuit 70 is turned into the L level only with the turn on of either one of these switches 27 and 42 which occurs earlier than the turn on of the other.

Thereafter, the write control circuit 96 causes the voltage double circuit 91 to operate so as to boost the voltage V1 (VCC2) supplied from the battery 35 to a driving voltage VDD and supplies the driving voltage VDD to the IC memory 22. Further, the write control circuit 96 controls the parallel/serial (P/S) transformation circuit 97 to read in data on a cumulative time counted at that instant by the cumulative time counter circuit 95. In synchronism with a synchronizing clock (SCL) provided by the write control circuit 96, the parallel/serial (P/S) transformation circuit 97 transforms the data on the cumulative time into serial date of the cumulative time and sends the serial date of the cumulative time to the IC memory 22. The serial data on the cumulative time are written in the IC memory 22 at an address assigned to an exposure frame number indicated on the address counter of the write control circuit 96. Since, whenever the shutter is operated, the trigger signal "*TRG" is turned into the L level to cause write of exposure data in the IC memory 22, an occurrence of inconsistency between the exposure frame number and the exposure data which are written in the IC memory 22 is prevented.

At completion of writing the data in the IC memory 22, the write control circuit 96 turns the busy terminal 31a into the H level from the L level and supplies it as a charge signal to the oscillation transistor 50. In consequence, the oscillation transistor 50 starts its oscillatory operation to charge the main capacitor 28 in the same manner as when the charge switch 38 is turned on. On the other hand, the write control switch 75 is turned on to have the write control IC 31 ready for writing data on another exposure. The busy terminal 31a is turned into the high impedance state after a specified duration of the H level.

With the progress of exposures, exposure data are written in the IC memory 22 whenever exposure is made on the filmstrip 17. When the maximum number of exposures available on the filmstrip 17 are exposed and the filmstrip 17 is completely rewound into the film cartridge 16, the lens-fitted film unit 10 is given as it is to a photofinisher who first removes the film cartridge 16 with the exposed filmstrip 17 to transfer the exposure data written in the IC memory 22 onto the magnetic layer of the filmstrip 17. On the other hand, the photofinisher forwards the lens-fitted film unit 10 to the manufacturer for recycling. The filmstrip 17 is removed from the film cartridge 16 to be developed and make prints from the negatives. During making prints, the exposure data for each negative are read out from the magnetic layer of the filmstrip 17 or the IC memory 22 of the film cartridge 16 to print an exposure date and other exposure data on a print if requested by the customer. After making prints, the filmstrip 17 is received in the film cartridge 16 and returned together with the prints to the customer.

FIGS. 6 through 9 show a lens-fitted film unit according to another embodiment of the invention in which battery power consumption is small even while a charge switch remains turned on and data write into an IC memory is carried out without fail. The lens-fitted film unit of this embodiment is similar to that of the previous embodiment excepting an addition of an aspect ratio variable viewfinder window and its related parts and an elimination of an auxiliary switch and its related parts and is factory preloaded with the film cartridge 16 shown in FIG. 2.

Figure 6:
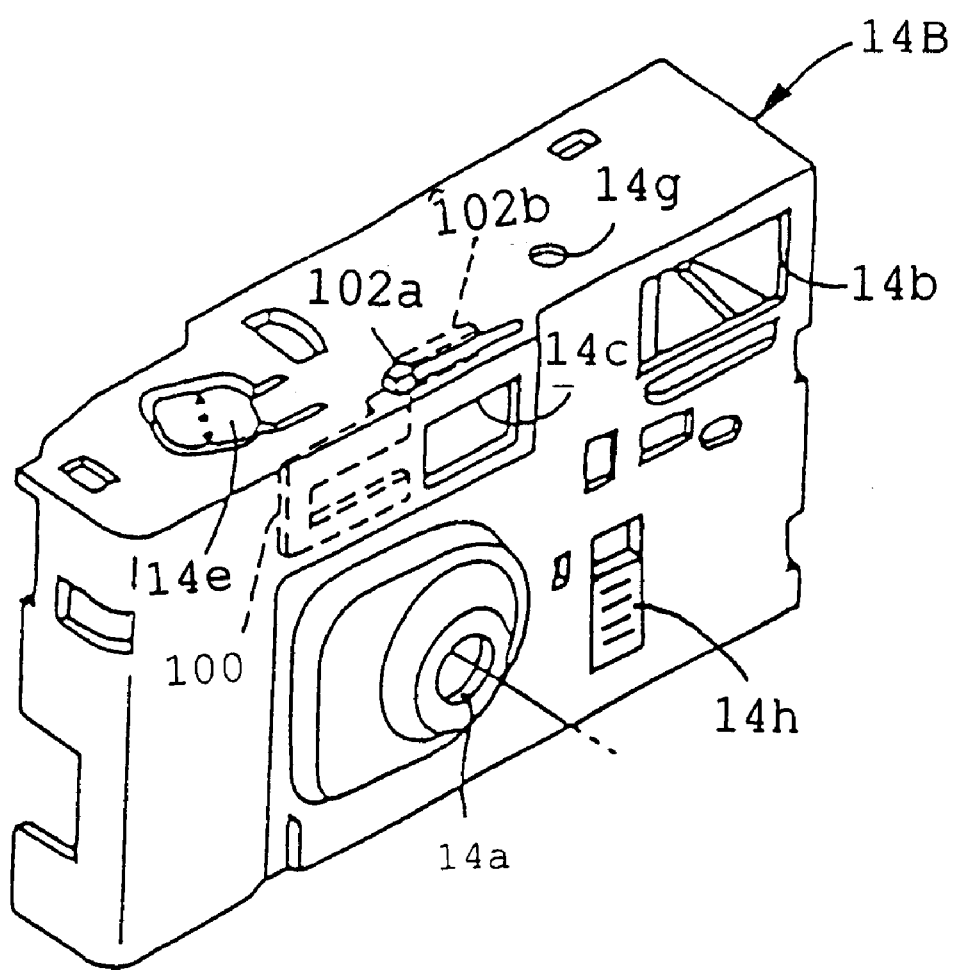
FIG. 6 is a perspective view of a front case section of a lens-fitted film unit according to another embodiment of the invention.

Referring to FIG. 6 in which only a front case section 14B is shown because the remaining parts of the lens-fitted film unit are the same in structure and operation as those of the previous embodiment, a slide window frame 100 with a slide knob 101 is installed behind the front case section 14B. The slide window frame 100 is movable between two positions, namely a regular photographing position where the slide window frame 100 is positioned out of the viewfinder window 14c and a panoramic photographing position where the slide window frame 100 is position ed behind the viewfinder window 14c. The viewfinder window 14c has the same aspect ratio as a standard aspect ratio of 9:16 of an image frame of the filmstrip 17 which is the aspect ratio of the high-vision TV screen. The slide window frame 100 has an aspect ratio of approximately 1:2.8 suitable for a panoramic format (which is referred to as a panoramic aspect ratio). The slide window frame 100 at its back is provided with a reflection plate 102a with a high reflectivity which cooperates with a photo-sensor 102b of the built-in electronic flash unit 13 to work as a mode sensor 102 (see FIG. 7). The mode sensor 102 provides a mode signal "MODE" at the H level while the slide window frame 100 is in the panoramic photographing position with the reflection plate 102a facing the photo-sensor 102b or a mode signal "MODE" at the L level while the slide window frame 100 is out of the panoramic photographing position, i.e. in the regular photographing position. This mode signal is used to determine whether a photograph is taken in a regular format mode or in a panoramic format mode. The mode sensor 102, which is of an optical type, may be replaced with an electric type of sensor. Any viewfinder window aspect ratio varying device may be installed in place of the slide window frame 100 to vary the aspect ratio of the viewfinder window or vary the field of view of the viewfinder optical system.

Figure 7:
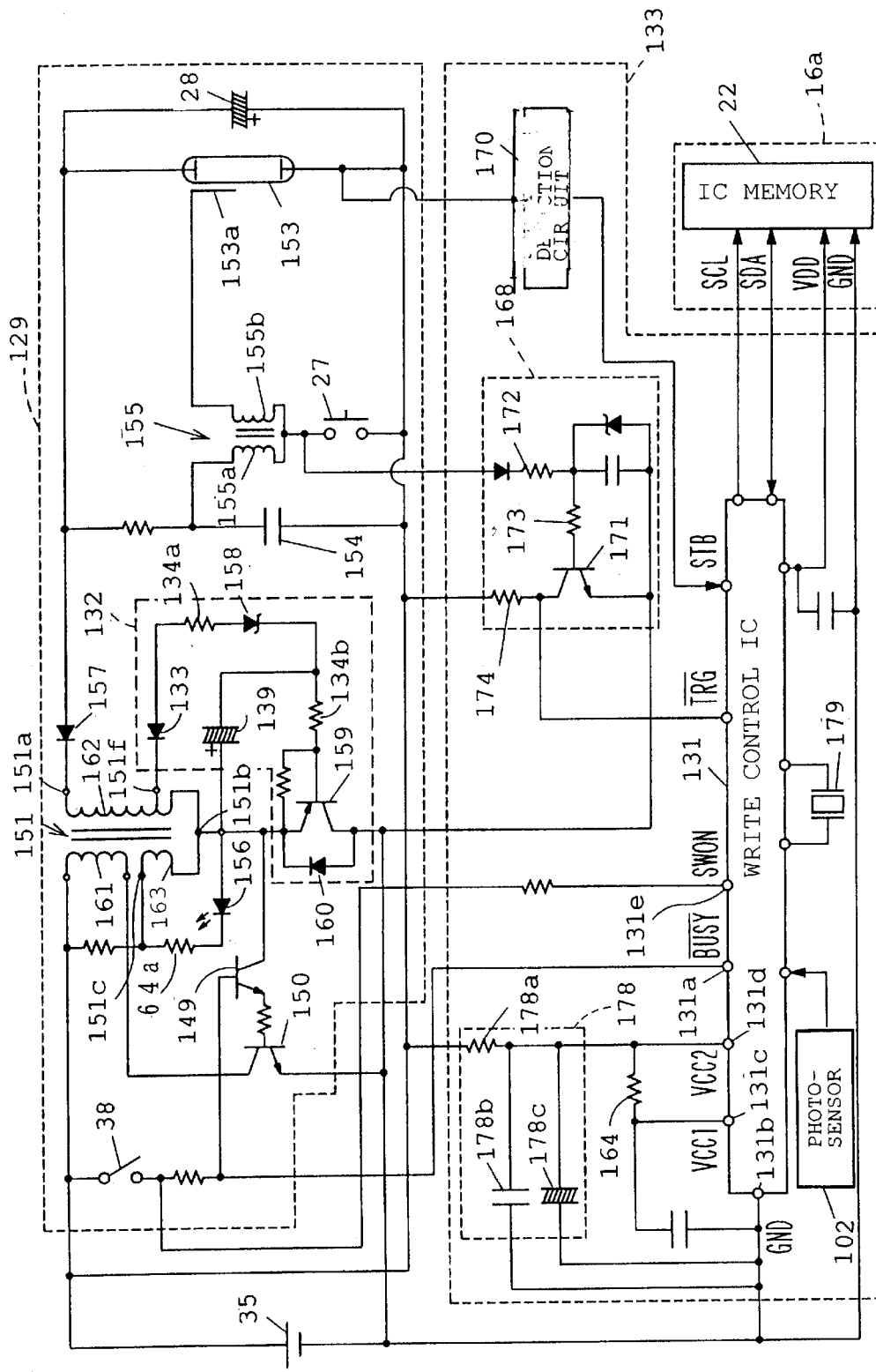
FIG. 7 is a circuit diagram showing a circuit installed in the lens-fitted film unit shown in FIG. 6.

FIG. 7 shows a circuit diagram installed in the lens-fitted film unit 10 shown in FIG. 6. An electronic flash circuit 129 comprises an NPN type of oscillation transistor 150, an oscillation transformer 151, a switching transistor 149, an oscillation interruption circuit 132, a discharge tube (Xe tube) 153, a trigger capacitor 154, a trigger transformer 155, a light-emitting diode (LED) 156, a charge diode 157 and associated parts in addition to the synchronized switch 27, the main capacitor 28 and the charge switch 38. The LED 156 is installed in the front case section 14B and is seen through a window 14g formed in the top wall of the front case section 14B to confirm whether the electronic flash is ready for making a flash. The oscillation transistor 150 and the oscillation transformer 151 form a known type of blocking oscillation circuit which converts a low voltage of the battery 35 to a high voltage and charges the main capacitor 28 with the high voltage. When the charge switch 38 is turned on by sliding up the slide knob 14h, the switching transistor 149 is turned conductive to supply a charge signal to the oscillation transistor 150. Specifically, the oscillation transistor 150 is supplied with a base current from the battery 35 through a tertiary coil 163 of the oscillation transformer 151 and a resistance 164a to turn conductive so as thereby to permit a flow of collector current through a primary coil 161 of the oscillation transformer 151, and then amplifies the collector current with an increase in the base current due to positive feedback operation through the oscillation transformer 151 to oscillate.

High voltage electromotive force of e.g. approximately 300 volts is generated at a secondary coil 162 of the oscillation transformer 151 according to a winding ratio between the primary and secondary coils 161 and 162 while the oscillation transistor 150 oscillates. The charge diode 157 permits a secondary side current caused in the presence of the electromotive force and flowing only in a direction from a terminal 151e to a terminal 151d of the secondary coil 162 of the oscillation transformer 151 to be supplied to the main capacitor 28. An intermediate terminal potential Vtf at the intermediate terminal 151f of the secondary coil 162 oscillates due to oscillatory operation of the blocking oscillation circuit, and the overall voltage level is proportionally varied to an increase in a charging voltage Vc of the main capacitor 28. Because, in this electronic flash circuit 129, the main capacitor 28 is charged with negative charges, the intermediate terminal potential Vtf drops proportionally to an increase in a charging voltage Vc of the main capacitor 28. The intermediate terminal 151f is specified in position on the secondary coil 162 such that a specified voltage difference Von is provided between a terminal voltage Vtd at a terminal 151d and the terminal potential Vtf when the main capacitor 28 attains a prescribed charging voltage Va with an effect of generating electromotive force at the secondary coil 162. The voltage difference Von is a Zener voltage Vz of a Zener diode 158 added by a voltage drop (approximately 0.6 volts) caused by a rectifier diode 133 and set to a low voltage so as to allow a Zener diode of a low Zener voltage Vz to be employed. For example, when the Zener diode 158 of a Zener voltage of 10 volts is employed, the intermediate terminal 151f is positioned at a point at which the entire windings of the secondary coil 162 is divided at a ratio of windings between the terminals 151f and 151d relative to windings between the terminals 151e and 151f of approximately 1/30, which provides a voltage difference Von of 10.6 volts. When the Zener diode 158 of a Zener voltage of 30 volts is employed, the intermediate terminal 151f is positioned at a point at which the entire windings of the secondary coil 162 is divided at a ratio of windings between the terminals 151f and 151d relative to windings between the terminals 151e and 151f of approximately 1/10, which provides a voltage difference Von of 30.6 volts.

The oscillation interruption circuit 132 includes the rectifier diode 133 connected to the intermediate terminal 151f of the secondary coil 162 of the oscillation transformer 151, resistances 134a and 134b, the Zener diode 158, an oscillation interruption transistor 159 and an oscillation interruption capacitor 139. Each of the rectifier diode 133 and the Zener diode 158 functions to perform temperature compensation to the other. The rectifier diode 133 rectifies an alternating voltage appearing at the intermediate terminal 151f of the secondary coil 162 of the oscillation transformer 151 to take out a negative voltage only. The oscillation interruption transistor 159 has a base connected to the cathode of the Zener diode 158 through the resistance 134b, an emitter connected to the base of the oscillation transistor 150 through the switching transistor 149 and a collector connected to the emitter of the oscillation transistor 150. Connected between the emitter and collector of the oscillation interruption transistor 159 is a diode 160 which prevents the oscillation interruption transistor 159 from being possibly damaged or broken with a counter voltage applied from a trigger detection circuit 171 which will be described later. The Zener diode 158 used in the electronic flash circuit 129 has a low Zener voltage Vz of, for example, 10 volts and is supplied with a direct voltage which is provided by rectifying the voltage between the terminals 151d and 151f by the rectifier diode 133. The rectifier diode 133 is adapted to provide a rectified direct voltage equal to the Zener voltage Vz when the main capacitor 28 attains a prescribed charge voltage. The Zener diode 158 admits a Zener current flow (a current flowing in the counter direction) therethrough when the main capacitor 28 attains the prescribed charge voltage. While the Zener diode 158 interrupts a Zener current flow, the charge interruption transistor 159 is not supplied with a base current, so as to remain nonconductive. On the other hand, while the Zener diode 158 admits a Zener current flow therethrough, in other words, when the Zener diode 158 at its cathode is at a voltage lower than 0 volt, the charge interruption transistor 159 is supplied with a voltage higher than an operation voltage between the emitter and the base and in consequence supplied with the Zener current as a base current, so as to turn conductive. At this time, the oscillation transistor 150 turns nonconductive in presence of isopotential at the base and emitter. Since the electronic flash circuit 129 is structured such that the charge interruption transistor 159 operates when the terminal potential Vtf at the intermediate terminal 151f drops to a specified level, the utilization is made of the rectifier diode 133 and the Zener diode 158 having a low Zener voltage Vz both of which are chip in order to form the circuit operative to interrupt charging the main capacitor 28 by turning the charge interruption transistor 159 conductive, which is advantageous to produce the electronic flash circuit 129 at low costs.

In the electronic flash circuit 129, since the charge switch 38 remains turned on during charging the main capacitor 28, the oscillation transistor 150 possibly fails in turning nonconductive even when the charge interruption transistor 159 is instantaneously turned conductive. Therefore, the oscillation interruption capacitor 139 is connected directly between the Zener diode 158 and the oscillation transformer 151 at the terminal 151d. The oscillation interruption capacitor 139 is charged with the Zener current admitted through the Zener diode 158 to an appropriate charging voltage Vc when the main capacitor 28 is charged to the prescribed charging voltage Va. Thereafter, the oscillation interruption capacitor 139 is discharged through the resistance 134b to supply a base current to the charge interruption transistor 159, so as thereby to turn the charge interruption transistor 159 conductive. It is realized by discharging the oscillation interruption capacitor 139 through the resistance 134b to spend a relatively long time on supplying a base current to the charge interruption transistor 159, so that the oscillation transistor 150 is reliably interrupted in oscillatory operation by prolonging a period of time for which the charge interruption transistor 159 remains conductive. The conductive period of time of the charge interruption transistor 159 is adjusted according to a time constant which depends on an electrostatic capacity of the oscillation interruption capacitor 139 and a value of resistivity of the resistance 134b. For example, an actual conductive period of time of the charge interruption transistor 159 is 0.3 seconds when using a capacitor having an electrostatic capacity of 47 $\mu$F for the oscillation interruption capacitor 139 and a resistance having a value of resistivity of 10 K$\Omega$ for the resistance 134b. After the main capacitor 28 has been charged to the prescribed charging voltage Va once, while the charge switch 145 remains turned on, the charge interruption transistor 159 turns nonconductive when the oscillation interruption capacitor 139 is discharged to drop the charging voltage Vc, as a result of which the oscillation transistor 150 resumes the oscillatory operation. Immediately thereafter, the oscillation interruption capacitor 139 is charged again. The oscillation transistor 150 repeats interruption and resumption of the oscillatory operation in response to discharging and recharging the oscillation interruption capacitor 139, respectively.

The LED 156 continually flashes on and off in response to alternately discharging and recharging the oscillation interruption capacitor 139, respectively. The time interval at which the LED 156 flashes on and off is adjusted according to a time constant which depends on an electrostatic capacity of the oscillation interruption capacitor 139 and a value of resistivity of the resistance 134b as well as the conductive period of time of the charge interruption transistor 159. It is confirmed by means of flashing on and off of the LED 156 on a high frequency that the electronic flash is ready for making a flash.

The trigger capacitor 154 is charged with a secondary side current while the main capacitor 28 is charged, and discharged in response to a turn of the synchronous switch 27 to the on-state which is caused by actuation of the shutter. The discharged electricity flows through a primary coil 155a of the trigger transformer 155, which is accompanied by an appearance of a high voltage of, for example, 4 Kvolts as a trigger voltage at a secondary coil 155b of the trigger transformer 155. The trigger voltage is delivered to the discharge tube 153 through a trigger electrode 153a disposed in close proximity to the discharge tube 153. As a result, the Xe gas in the discharge tube 153 is ionized to cause the main capacitor 28 to discharge electric charges which flows through the discharge tube 153, so that the discharge tube 153 is triggered to make a flash. In place of interrupting charging the main capacitor 28 by means of the oscillation interruption circuit 132, the interruption of charging the main capacitor 28 may be done by turning a busy signal (which will be described later) into the L level following attainment of the prescribed charging voltage Va of the main capacitor 28 which is detected based on a potential change caused in the electronic flash circuit 129 or a change in oscillation frequency of the electronic flash circuit 129.

The data record circuit 133 comprises a trigger detection circuit 168, a crystal oscillator 179 and a flash detection circuit 170 in addition to the mode sensor 102 and the write control IC 31. The flash detection circuit 170 provides a flash detection signal "STB" indicating that the discharge tube 153 has been triggered to make a flash when detecting a current flow through the discharge tube 153 resulting from discharging the main capacitor 28. For example, the flash detection signal "STB" continues to be at the H level for a fixed period of time after the discharge tube 153 has been triggered to make a flash. The trigger detection circuit 168, which monitors completion of an exposure, includes an NPN type of transistor 171 and a diode 172 as essential components. The diode 172 is used to prevent the transistor 171 from being applied with an counter voltage due to which the transistor 171 is possibly damaged or broken and has an anode which is connected between the synchronous switch 27 and the trigger transformer 155 and a cathode which is connected to the base of the transistor 171 through a resistance 73. The transistor 171 with its collector connected to the battery 35 at the plus side through a resistance 174 turns conductive and nonconductive in response to turning on and off of the synchronous switch 27, respectively, to provide negative potential as a trigger detection signal "*TRG" at the collector. Specifically, while the synchronous switch 27 remains turned off, the transistor 171 is kept from being applied with a base current and in consequence remains nonconductive, so that a positive potential as a trigger detection signal "*TRG" appearing at the collector of the transistor 171 turns into the H level (1.5 volts), i.e. the battery potential. On the other hand, when the synchronous switch 27 turns on in response to actuation of the shutter, the transistor 171 is supplied with a base current to turn conductive, so that the collector potential as the trigger detection signal "*TRG" drops to turn into the L level (0 volt).

The write control IC 131 has a ground (GND) terminal 131b connected to a power line leading to the battery 35 at the minus side, Vcc1 and Vcc2 terminals 131c and 131d connected to a power line leading to the battery 35 at the plus side through resistances 164j and 178a, respectively, and a terminal 131e connected to the power line leading to the battery 35 at the plus side through the charge switch 38. The resistance 178a forms a part of a filtering circuit 178 which will be described later. The write control IC 131 remains active with a driving voltage VCC1 (approximately equal to V1) supplied at the Vcc1 terminal 131c to control data write in the IC memory 22 and boosts a source voltage VCC2

(approximately equal to V1) supplied at the Vcc2 terminal 131d through a voltage double circuit 91 and supplies it as a driving voltage VDD (3 volts) to the IC memory 22. When the charge switch 38 is turned on, the write control IC 131 at the terminal 131e is supplied with a switch-on signal "SWON" to actuate the timer circuit 186 through the write control circuit 92. The write control IC 131 is designed and adapted such as to be hard to transfer exposure data into the IC memory 22 but to protect data written in the IC memory 22 even in the case where a large voltage drop occurs at the Vcc1 terminal at commencement of charging the main capacitor 28.

The filtering circuit 178, which works to prevent the write control IC 131 from causing operational errors, comprises the resistance 178a and first and second capacitors 178b and 178c which are connected between the power lines leading to the battery 35. The filtering circuit 178 absorbs electric noises caused in the power lines due to discharge of the main capacitor 28 through the discharge tube 53 and ripple noises caused in the power lines while the main capacitor 28 is charged. Since the resistance 178a is provided in the power line connected to the battery 35 at the plus side, the voltages VCC1 and VCC2 supplied to the write control IC 131 at the Vcc1 and Vcc2 terminals, respectively, drop according to a current flow through across the resistance 178a. However, since current consumption which the write control IC 131 makes at the Vcc1 terminal 131c is approximately 3 μA which is significantly small, a voltage drop at the Vcc1 terminal 131c is quite small. On the other hand, while current consumption for the IC memory 22 runs up to approximately 3 mA during data writing, nevertheless, since a time necessary for every data writing which is as short as approximately 10 msec., which does not make the first and second capacitors 178b and 178c cause a voltage drop while charging them under normal conditions, no voltage drop at the Vcc2 terminal 131d occurs even during data writing. The driving voltages VCC1 and VDD are given margins, respectively, so that the write control IC 131 and the IC memory 22 operate normally although the resistance 178a is provided in the power line connected to the battery 35.

Figure 8:
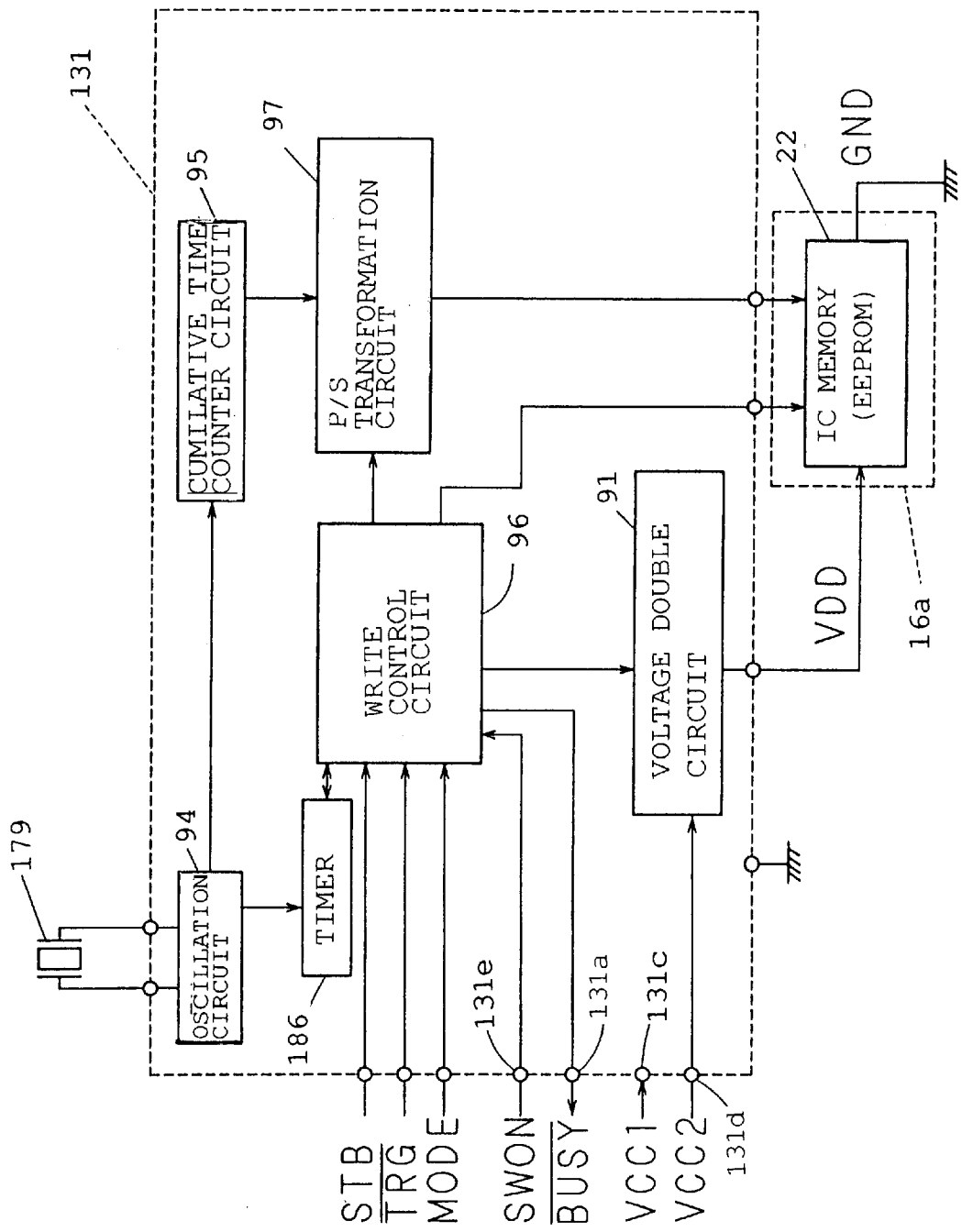
FIG. 8 is a block diagram schematically showing a write control IC of the circuit shown in FIG. 7.

Referring to FIG. 8 showing a circuit structure of the write control IC 131 which is similar to the write control IC 31 (FIG. 5) of the lens-fitted film unit 10 previously described, with the exception of a timer circuit 186 provided therein. Although there is not shown in the figure, the write control IC 131 includes a circuit operative to write basic data in the IC memory 22 of the film cartridge 16 and initialize the cumulative time counter circuit 95 by the aid of an external computer. The oscillation circuit 94 cooperates with the crystal oscillator 79 to generate a clock on a fixed frequency. The cumulative time counter circuit 95 cumulatively counts a time from the starting time written in the IC memory 22 based on the clock and sends data on the cumulative time to the parallel/serial (P/S) transformation circuit 97. The write control circuit 96 receives a mode signal "MODE" from the mode sensor 102, a flash detection signal "STB" from the flash detection circuit 170, a trigger detection signal "*TRG" from the trigger detection circuit 168 and a switch-on signal "SWON" from the charge switch 38. After receiving the trigger detection signal "*TRG," the write control circuit 96 generates discrimination data indicating a selected aspect ratio or a selected position of the viewfinder window and execution of a flash exposure based on the mode signal "MODE" and the flash detection signal "STB" and sends the discrimination data to the parallel/serial (P/S) transformation circuit 97. The parallel/serial (P/S) transformation circuit 97, which is controlled by the write control circuit 96, transforms exposure data including the discrimination data and the cumulative time data at a moment of an appearance of the trigger detection signal "*TRG" into serial data (SDA) and sends the serial data (SDA) to the IC memory 22 in synchronism with a synchronizing clock (SCL) provided by the write control circuit 96 and then writes them in the IC memory 22. When the blocking oscillation circuit, i.e. the electronic flash circuit 129, operates while writing the exposure data in the IC memory 22, it is possibly hard to write correctly the exposure data in the IC memory 22 due to electric noises caused in the electronic flash circuit 129, a voltage drop and/or voltage fluctuations of the battery 35 and the like. In order to eliminate such errors, the write control IC 131 is provided with the bust terminal 131a which works as a charge control terminal for prohibiting operation of the electronic flash circuit 129 while writing exposure data in the IC memory 22. The state of the bust terminal 131a is controlled by the write control circuit 92. The busy terminal 131a, which is of the type of three state terminal well known in the art which can change itself into a high impedance state as well as outputting a busy signal "*BUSY" at the H level or at the L level therefrom, leads to the switching transistor 149 at the base of the electronic flash circuit 129.

The write control circuit 96 turns the busy signal into the L level by changing the busy terminal 131a to an interiuption state in which the electronic flash circuit 29 is kept from charging the main capacitor 28 during writing data, so as to turn the switching transistor 149 nonconductive, thereby interrupting the oscillation transistor 150 from being supplied with a base current with an effect of interrupting operation of the electronic flash circuit 129. On the other hand, the write control circuit 96 turns the busy signal into the high impedance state when permitting the oscillation transistor 150 to remain conductive. Further, in response to completion of the write of exposure data in the IC memory 22, the write control circuit 196 turns the busy signal into the H level by changing the busy terminal 131a to a perdition state in which the electronic flash circuit 29 permits charging the main capacitor 28. In consequence, the busy signal at the H level is supplied as a charge signal to the switching transistor 149 to start charging the main capacitor 28.

If the charge switch 38 remains turned on, the main capacitor 28 is continuously charged, which causes useless battery power consumption. Therefore, the write control circuit 196 turns the busy terminal 131a into the interruption state when a specified time T, for example one hour in this embodiment, from turning on the charge switch 38 is counted by the timer circuit 186 so as to turn the busy signal to the L level, thereby interrupting charging operation of the electronic flash circuit 129. Resuming the charging operation of the electronic flash circuit 129 is caused by turning on the charge switch 38 again after having turned off it once. The specified time T is desired as long as flash exposures of the maximum number of exposures available on the filmstrip 17 and recording exposure data of the entirely exposed filmstrip 17 can be performed even if the charge switch 38 is left remaining turned on several times.

Figure 9:
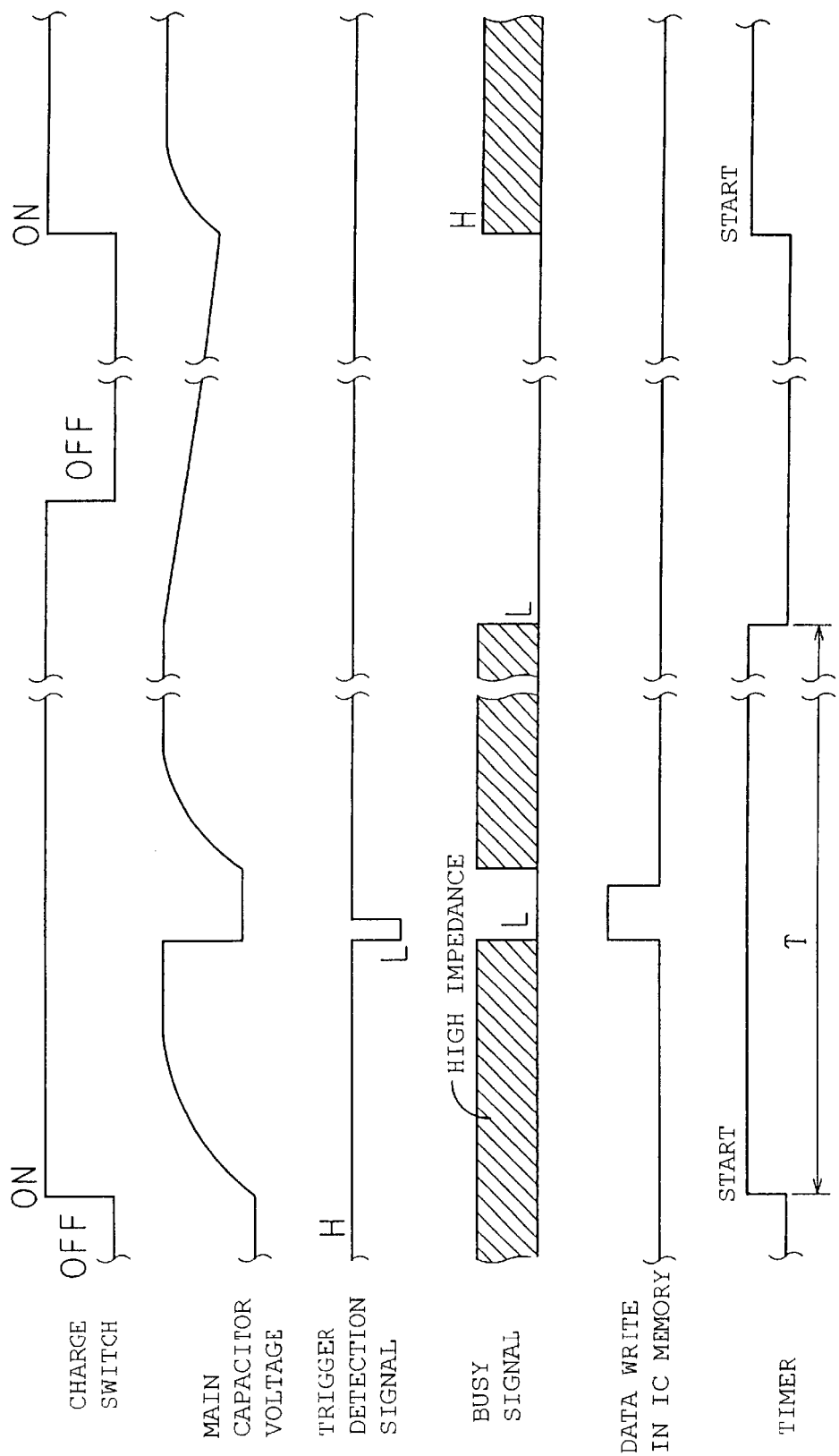
FIG. 9 is a graphical chart illustrating various signals from a start of charging to interruption of charging.

In operation of the lens-fitted film unit 10, the write control IC 131 is placed under operation by receiving a driving voltage VCC1 from the battery 35 since the battery 35 is fixedly installed in the lens-fitted film unit 10 at the manufacturer. According to the photographer's intention, the slide window frame 100 is moved into the regular photographing position or the panoramic photographing position. Before making the first flash exposure, the slide knob 14h is slid up to turn on the charge switch 38. As shown in FIG. 9, in the initial state, because the busy terminal 131a of the write control IC 131 is in the high impedance state, the switching transistor 149 is turned conductive when the charge switch 38 turns on, so that the oscillation transistor 150 is supplied with a base current, and then starts oscillatory operation. During the oscillatory operation of the oscillation transistor 150, the oscillation transformer 151 generates a secondary side current across the secondary coil 162 with which the main capacitor 28 is charged through the charge diode 157. As the main capacitor 28 increases a charging voltage Vc with the progress of charging, the potential at the terminal 151c of the tertiary coil 163 of the oscillation transformer 151 gradually drops and becomes lower than that at the terminal 141d to supply a forward voltage to the LED 156 as long as there is no counter electromotive force. When the main capacitor 28 attains a charging voltage Vc higher than 250 volts, the LED 156 flashes as dimly as visible and is seen through the window 14g. When the main capacitor 28 is charged to the prescribed charging voltage Va of 300 volts, the LED 154 flashes on brightly. On the other hand, as the main capacitor 28 is charged and gradually increases a charging voltage Vc, the terminal potential Vtf at the intermediate terminal 151f of the secondary coil 162 of the oscillation transformer 151 gradually drops according to the charging voltage Vc. When the main capacitor 28 is charged to the prescribed charging voltage Va of 300 volts, the Zener diode 158 admits a Zener current flow therethrough. Since the Zener current flows in a direction from the terminal 151d to the intermediate terminal 151f through the oscillation interruption capacitor 139, the oscillation interruption capacitor 139 is charged with the Zener current and completely charged up in a short period of time, e.g. 10 msec. Immediately after the main capacitor 28 has attained the prescribed charging voltage Va, the Zener diode 158 admits the Zener current flow through the oscillation interruption capacitor 139, so that the charge interruption transistor 159 does not turn conductive due to a voltage of 0 volt between the base and the emitter thereof. After the oscillation interruption capacitor 139 has been charged up, the charging voltage Vc of the oscillation interruption capacitor 139 appears between the base and the emitter of the charge interruption transistor 159, so that the oscillation interruption capacitor 139 is discharged through a closed circuit which is formed by the oscillation interruption capacitor 139, the base and emitter of the charge interruption transistor 159 and the resistance 134b, as a result of which the charge interruption transistor 159 is supplied with a base current to turns conductive. In consequence, the oscillation transistor 150 is shut off from supply of the base current from the battery 35 through the charge switch 38 and then turned nonconductive with the result of interruption of charging the main capacity 28. Since the oscillation interruption capacitor 139 is discharged through the resistance 134b, the charge interruption transistor 159 remains continuously conductive for a period of time (e.g. approximately 0.3 sec.) according to a time constant which depends on an electrostatic capacity of the oscillation interruption capacitor 139 and a value of resistivity of the resistance 134b. The oscillation transistor 150 is shut off from supply of a base current to interrupt oscillatory operation for that conductive period of time, so as to interrupt charging the main capacitor 28. As the oscillation interruption capacitor 139 decreases a charging voltage Vc with the progress of discharging and when attaining the specified charging voltage Vb, the charge interruption transistor 159 turns nonconductive. At this time, if the charge switch remains turned on, the oscillation transistor 50 is supplied with a base current again to resume oscillatory operation. On the other hand, at this time, since the main capacitor 28 has been charged up to the prescribed charging voltage Va, the Zener diode 158 admits a Zener current flow therethrough immediately after the resumption of the oscillatory operation of the oscillation transistor 50, the oscillation interruption capacitor 139 is charged in the same manner. Thereafter, the oscillation interruption capacitor 139 is discharged with the result of turning the charge interruption transistor 159 conductive, so as to interrupt oscillatory operation of the oscillation transistor 150 and, in consequence, interrupt charging the main capacitor 28. When the charge interruption transistor 159 turns conductive, the oscillation transistor 150 repeats interruption and resumption of the oscillatory operation to interrupt and resumption of charging the main capacitor, respectively, as long as the charge switch 38 remains turned on. In this manner, the main capacitor 28 is intermittently charged so as to make up a natural discharge, as a result of which the main capacitor 28 keeps the charging voltage Vc at an approximately constant level. At this time, the LED 154 continues to flash on while the main capacitor 28 is discharged due to oscillation of the oscillation transistor 150 and goes off when the main capacitor 28 is charged up, so as to repeatedly flash on and off at regular intervals. When the shutter button 14e is depressed after ascertainment of the flashing on and off of the LED 154 on a high frequency this indicates that the electronic flash is ready for making a flash, the shutter blade 40 is actuated to open the exposure aperture 40a, so as to expose the filmstrip 17. At the moment that the shutter blade 40 completely opens the exposure aperture 40a, the synchronous switch 27 is turned on irrespective of the necessity of making a flash exposure. Following the turn on of the synchronous switch 27, the trigger capacitor 154 is discharged to cause the trigger transformer 155 generates a trigger voltage and applies it to the discharge tube 153 through the trigger electrode 153a when the main capacitor 28 has been charged up. As a result, the discharge tube 153 is triggered to make a flash, which causes the flash detection circuit 170 to turn the flash detection signal "STB" into the H level for a fixed period of time. In the case where the main capacitor 28 has not yet attained a charging voltage Vc necessary for the discharge tube 153 to make a flash, the discharge tube 153 is not triggered and the flash detection circuit 170 keeps the flash detection signal "STB" at the L level. Further, following the turn on of the synchronous switch 27, the transistor 171 turns conductive to turn the trigger detection signal "*TRG" into the L level. In response to the turn of the trigger detection signal "*TRG" into the L level, the write control circuit 196 actuates the voltage double circuit 91 to boost the voltage VCC2 and supplies it as a driving voltage VDD to the IC memory 22 with an effect of placing the IC memory 22 under condition ready for data writing.

Thereafter, the write control circuit 196 checks whether the flash tube 153 has made a flash exposure based on the level of the trigger detection signal "*TRG," and actuates the mode sensor 102 so as to receive a mode signal "MODE" indicating a selected aspect ratio or a selected position of the viewfinder from the photo-sensor 102a. Data on the selected position and execution of a flash exposure is latched as discrimination data in the write control circuit 196 in a short time from the reception of the flash detection signal. The write control circuit 96 further controls the parallel/serial (P/S) transformation circuit 97 to read in data on a cumulative time counted at that instant by the cumulative time counter circuit 95. The write control circuit 96 further provides a synchronizing clock, in synchronism with which the parallel/serial (P/S) transformation circuit 97 transforms the data on the cumulative time into serial date of the cumulative time and sends the serial date of the cumulative time to the IC memory 22. At completion of sending the serial date of the cumulative time to the IC memory 22, the write control circuit 96 transfers the discrimination data latched therein to the parallel/serial (P/S) transformation circuit 97 and provides a synchronizing clock, in synchronism with which the parallel/serial (P/S) transformation circuit 97 transforms the discrimination data into serial date and sends the serial date to the IC memory 22. These discrimination data and cumulative time data are written as exposure data in the IC memory 22 at a designated address. During writing the discrimination data and the cumulative time data in the IC memory 22, the write control circuit 96 turns the busy signal "BUSY" into the L level and keeps it at the L level for a specified period of time, for example 50 msec., from the reception of the trigger detection signal at the L level to completion of the exposure data writing in order to achieve the exposure data writing in the IC memory 22 without fail. Therefore, even if the charge switch 38 remains turned on, the oscillation transistor 150 is shut off from supply of the base current with the result of interruption of charging the main capacity 28, is that the exposure data writing in the IC memory 22 is not affected by a voltage drop and noises induced by operation of the flash circuit and achieved reliably. At completion of the exposure data writing in the IC memory 22, the write control circuit 96 turns the busy terminal 131a into the perdition state to send a bust signal "BUSY" at the H level to the oscillation transistor 150, so as to cause the oscillation transistor 150 to operate, thereby starting charging the main capacitor 28 in the same manner as when the charge switch 38 is turned on. The write control circuit 96 turns the busy terminal 131a into the high impedance state the perdition state after a fixed duration of the busy signal "BUSY" at the H level.

On the other hand, at the moment that the charge switch 38 is turned on, the write control circuit 196 resets the timer circuit 186 and then causes it to resume counting. When the timer circuit 186 counts a specified time, e.g. one hour, the write control circuit 196 turns the busy terminal 131a into the interruption state to provide a busy signal at the L level. In consequence, the switching transistor 149 is shut off from supply of a base current and then turns nonconductive with the result of interruption of oscillatory operation oscillation transistor 150. As a result, even if the slide knob 14h is left being slid up with the charge switch 38 remaining turned on, the main capacitor 28 is prevented from being charged with an effect of useless battery power consumption. For resuming charging the main capacitor 28, the slide knob 14h is pushed down to turn off the charge switch 38 once and then slid up to turn on the charge switch 38.

When the maximum number of exposures available on the filmstrip 17 are exposed and the filmstrip 17 is completely rewound into the film cartridge 16, the lens-fitted film unit 10 is given as it is to a photofinisher who first removes the film cartridge 16 with the exposed filmstrip 17 to read out the basic data and the exposure data including the discrimination data and the cumulative time data for the respective exposures from the IC memory 22 by means of a data reader. On the other hand, the photofinisher forwards the lens-fitted film unit 10 to the manufacturer for recycling. The discrimination data is used as exposure correction data during developing the exposed filmstrip 17 and/or making prints from the negatives and used to determine a format of the print. A date and time of exposure is determined by adding a time indicated by the cumulative time data to the initial date and time indicated by the basic data. The discrimination data and the date and time of exposure are recorded on the magnetic layer of the filmstrip 17 before or after development of the filmstrip 17 or written in the IC memory 22. During making prints, the exposure date is printed on a print if requested by the customer. After making prints, the developed filmstrip 17 is received in the film cartridge 16 and returned together with the prints to the customer.

Figure 10:
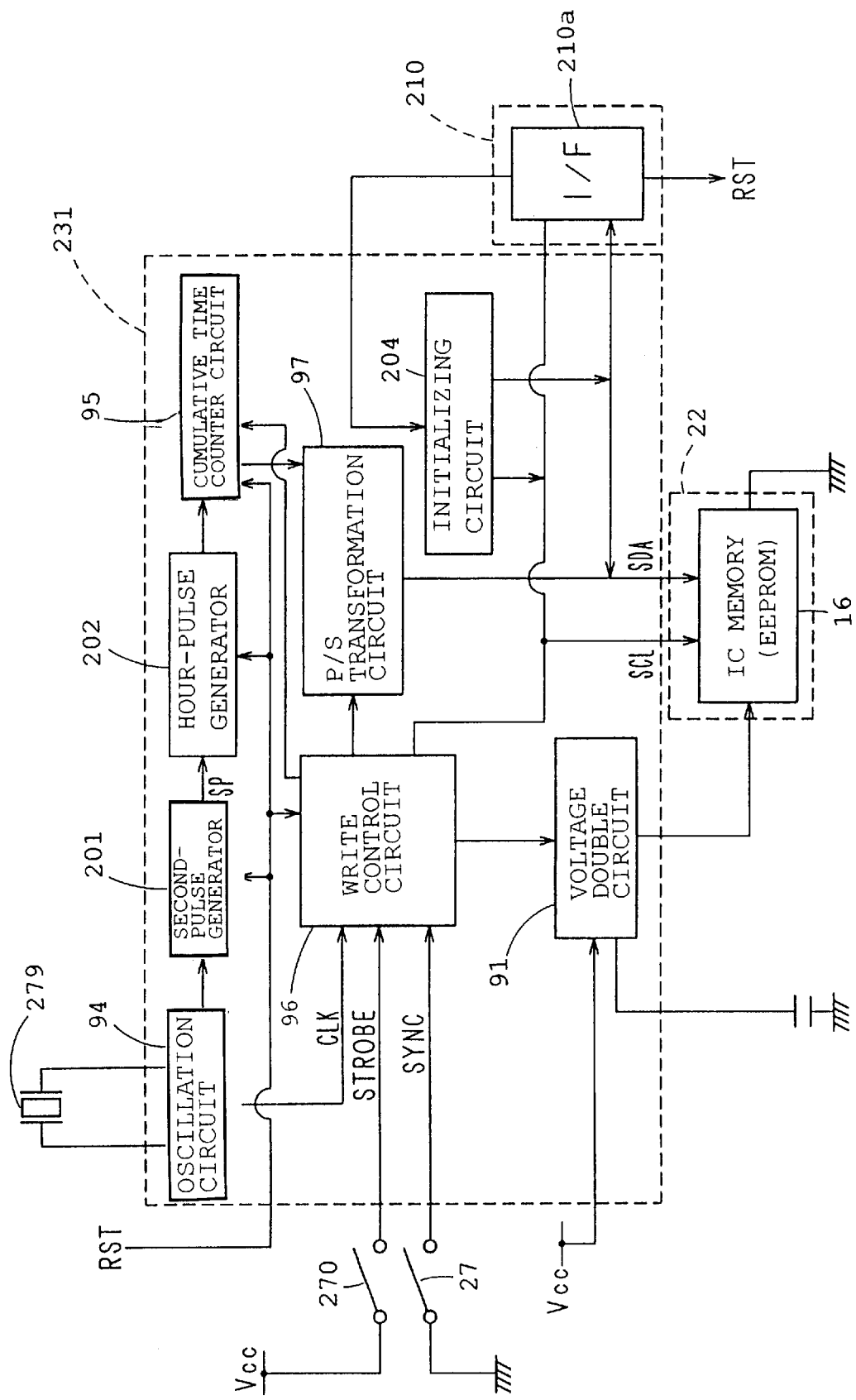
FIG. 10 is a circuit diagram showing another circuit installed in the lens-fitted film unit shown in FIG. 1.
Figure 11:
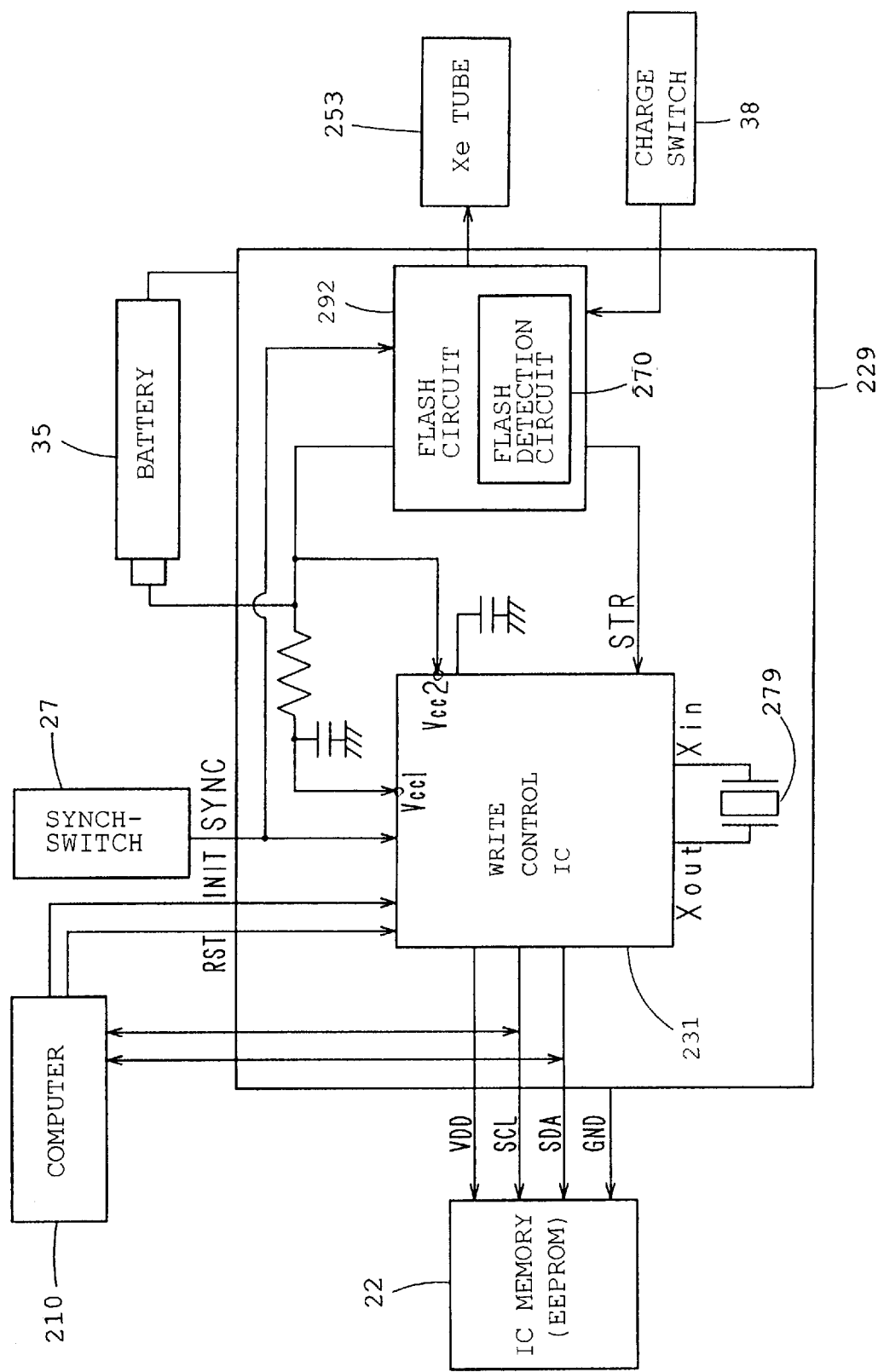
FIG. 11 is a block diagram schematically showing a write control IC of the circuit shown in FIG. 10.
Figure 12:
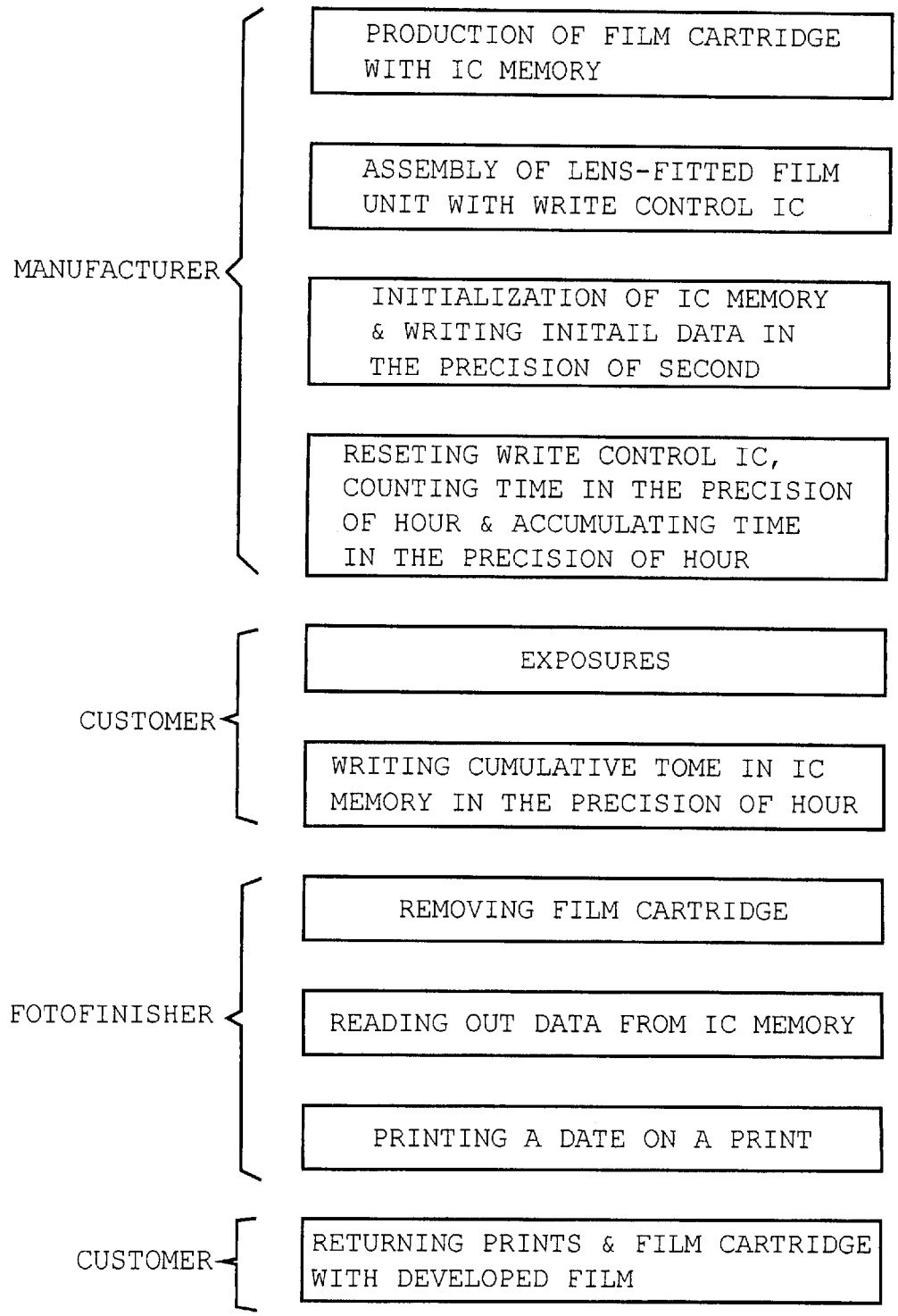
FIG. 12 is a flow chart illustrating steps from producing a lens fitted-film unit to reception of a processed film and prints together with a film cartridge.

FIGS. 10 through 12 show an improved circuit which can be installed in the lens-fitted film unit equipped with a date recording feature such as shown in FIG. 1 to maintain the accuracy of a date and time and saves a memory capacity of the IC memory.

Referring to FIG. 10, in combination with FIGS. 1 and 2, showing an electric flash circuit 229 and its associated circuits and a record control circuit 231 printed on a circuit board 34 which is installed to the built-in electronic flash unit 13, a battery 35 supplies a driving voltage V3 (e.g. 1 volt) to the record control circuit 231 at a Vcc1 terminal through a resistance 295 and a source voltage VCC2 (e.g. 1.5 volts) to the record control circuit 231 at a Vcc2 terminal. The record control circuit 231 remains operative in the presence of the driving voltage V3 at the Vcc1 terminal to control data writing in an IC memory 22. The record control circuit 231 boosts the voltage VCC2 and supplies it as a driving voltage VDD (3 volts) to the IC memory 22. An electric flash circuit 229, which comprises a charge circuit and a trigger circuit similar to those of the electric flash circuit 229 shown in FIG. 3, charges a main capacitor 28 when a charge switch 38 (see FIG. 1) is turned on and then triggers a discharge tube 253 to make a flash in response to a synchronizing signal "SYNC" provided by a synchronous switch 27. The electric flash circuit 229 includes a flash detection circuit 270 such as a semi-conductor switch operative to turn on for a fixed period of time so as to provide a flash detection signal "STB" which indicates that the discharge tube 253 has been triggered to make a flash and is sent to the write control IC 231.

Referring to FIG. 11 showing a circuit structure of the write control IC 231 which is similar to the write control IC 31 (FIG. 5) of the lens-fitted film unit 10 previously described, with the exception of a second-pulse generation circuit 201 and an hour-pulse generating circuit 202 provided therein. An oscillation circuit 94 cooperates with a crystal oscillator 79 to generate a clock "CLK" on a fixed frequency. The second-pulse generation circuit 201, to which is sent to which the clock "CLK" is sent, comprises a 15 steps of asynchronous binary counter which divides the clock "CLK" to generate a second-pulse "SP" per second and send it to the hour-pulse generation circuit 202 comprises a 12 steps of asynchronous binary counter which counts the second pulses and generates an hour-pulse per hour and sends it to a cumulative time counter 95. In this manner, a time is counted with the precision of a second. The cumulative time counter 95 comprises a 15 steps of binary counter which counts the hour-pulses as a cumulative time in hour. The cumulative time counter 95, which can count up to, for example, 32,768 hours (approximately 3.7 years), is initialized with a reset signal "RST" to reset its initial count to 0 (zero) at the manufacturer. Binary data on a cumulative time (which is referred to as cumulative time data) is read out according to an order and sent to a parallel/serial (P/S) transformation circuit 97 which a parallel signal is transformed into a serial signal. The second-pulse generation circuit 201, the hour-pulse generating circuit 202 and a write control circuit 96 are reset with the reset signal "RST" at the same time as well as the cumulative time counter 95.

The write control circuit 96 receives a synchronizing signal "SYNC" provided by a synchronous switch 27 and a flash detection signal "STB" provided by the flash detection circuit 270. After a specified period of time from reception of the synchronizing signal "SYNC," the write control circuit 96 generates a discrimination signal which indicates whether there is provided a flash detection signal "STB" and sends it to the parallel/serial (P/S) transformation circuit 97. Further, the write control circuit 96 actuates a voltage double circuit 91 when data is written in the IC memory 22 and sends a latch signal to the parallel/serial (P/S) transformation circuit 97 in response to reception of the synchronizing signal "SYNC" to transfer cumulative time data on a cumulative time counted at that instant by the cumulative time counter 95 in the parallel/serial (P/S) transformation circuit 97. The voltage double circuit 91, which is controlled in operation by the write control circuit 96 only when data is written in the IC memory 22, is connected to the battery 35 through Vcc2 terminal to boost the source voltage VCC2 and supply it as a driving voltage VDD to the IC memory 22. Therefore, the source voltage of the battery 35 is saved due to actuation of the voltage double circuit 91 only when data is written in the IC memory 22. The parallel/serial (P/S) transformation circuit 97, which is controlled by the write control circuit 96, transforms exposure data including the discrimination data and the cumulative time data into serial data (SDA). The serial data is sent bit by bit to the IC memory 22 in synchronism with a synchronizing clock (SCL) provided by the oscillation circuit 94 through the write control circuit 96. At the manufacturer, the write control IC 231 includes an initializing circuit 204 operative to initialize the IC memory 22 of the film cartridge 16 with an initializing signal "INIT" provided by an external computer 210.

The IC memory 22 latches the cumulative time data and the discrimination data bit by bit in synchronism with the synchronizing clock (SCL) and writes them at designated addresses. The address is counted by exposure frame of the filmstrip 17 and data type by a counter incorporated in the write control circuit 96. The count of the counter is sent to the IC memory 22 through the parallel/serial (P/S) transformation circuit 97 and decoded therein. An example of an address map of the IC memory 22 is shown below.

TABLE I

| ADDRESS | DATA |
|---------|------|
| 000 ~ 007 | HEADER AREA |
| 008 009 00A | $1^{ST}$ PACKET AREA |
| 07D 07E 07F | $40^{th}$ PACKET AREA |

The circuit board 34 is provided with an interface port (not shown) to which an interface circuit (I/F) 210a of the external computer 210 is connected. The external computer 210 is operated to enter a reset signal "RST" and an initializing signal "INIT" into the IC memory 22 and to write data in the IC memory 22 and read out data from the IC memory 22. At manufacturing the lens-fitted film unit, basic data on the maximum number of exposures available on the filmstrip 17, data on a date (year, month and day) of manufacture at a time of initialization of the IC memory 22 and initial data on hour and second at a time that the cumulative time counter 95 is reset are written in the header area of the IC memory 22 by the external computer 210 as shown in Table I.

TABLE II

| | ADDRESS | MSB D7 | D6 | D5 | D4 | D3 | D2 | D1 | LSB D0 |
|---|---|---|---|---|---|---|---|---|---|
| HEADER AREA | 000 | YEAR | | | | No. OF DAYS | | | |
| | 001 | No. OF DAYS | | | | HOUR | | | |
| | 002 | HOUR | | | SECOND | | | | |
| | 003 | SECOND | | | | | | 0 | 0 |
| | 004 | 0 | 0 | AVAILABLE EXPOSURES | | | | | |
| | 005 | RESERVED | | | | | | | |
| | 006 | RESERVED | | | | | | | |
| | 007 | RESERVED | | | | | | | |

The year data is written in the first four bits D7–D4 at the higher side (MSB) of the address #000. For example, in the case where the year "1995" is written as "0," the year "1997" is written as "000." Therefore, it is possible to write up to the 15th year "2010" which is expressed as "1111. " The date data is written in the last four bits D3–D0 at the lower side (LSB) of the address #000 and the first five bits D7–D3 at the higher side (MSB) of the address #001. For example, in the case where the date "January 1" is written as "1," the data on the date of initialization "March 22" is written as the number of days as "0001010001. " The time data on hour is written in the last three bits D2–D0 at the lower side (LSB) of the address #001 and the first two bits D7–D6 at the higher side (MSB) of the address #002 in the 24 hours system. For example, when the time of initialization is 1:00 am, i.e. 13 o'clock in the afternoon, it is written as "01101." Further, the time date on second is written in the last six bits D5–D0 at the lower side (LSB) of the address #002 and the first six bits D7–D2 at the higher side (MSB) of the the address #003. For example, the time of 30 min. 25 sec. is written as "011100100001. " The number of available exposures of the filmstrip is written in the last six bits D5–D0 at the lower side (LSB) of the address #004. The addresses #005–#007 are reserved for extension. The addresses #005–#007 may be assigned to data on whether the film cartridge 16 is loaded in the lens-fitted film unit.

Data written in the $1^{ST}$ to $40^{TH}$ packet areas shown in Table I are the cumulative time data for the $1^{ST}$ to $40^{TH}$ exposures which are read out from the cumulative time counter 95 as shown in Table III. The cumulative time data includes a last figure of a four-digit number indicating an year (for example "8" of "1998"), the number of days and a time. Specifically, first and second bytes are assigned to the last eight bits and the first seven bits of the cumulative time data, respectively. The last three bits of the third byte is assigned to data on photographic formats such as panoramic format (PNR) and tele-photographic format (TEL) and on a flash exposure (STB). In the case where the lens-fitted film unit is not equipped with the tele-photographic feature nor the panorama photographic feature, there are data "0" written in the corresponding bits.

TABLE III

| | | MSB D7 | D6 | D5 | D4 | D3 | D2 | D1 | LSB D0 |
|---|---|---|---|---|---|---|---|---|---|
| PACKET AREA | $1^{ST}$ BYTE | TIME DATA (FIRST 8 BITS) | | | | | | | |
| | $2^{ND}$ BYTE | 0 | TIME DATA (LAST 7 BITS) | | | | | | |
| | $3^{RD}$ BYTE | 0 | 0 | 0 | 0 | 0 | PNR | TEL | STB |

As previously described, the writing area for the cumulative time data has a capacity for 15 bits (7+8 bits) which is sufficient enough for data up to 32,768 hours (approximately 3.7 years) to be written with the precision of an hour. If writing the cumulative time data in second, 3.7 years is converted into 117,964,800 seconds which require 27 bits as a memory capacity. Therefore, the capacity of the Memory IC 22 is saved by writing a cumulative time data in hour.

FIG. 12 schematically shows the process from manufacturing the lens-fitted film unit shown in FIG. 1 to making prints. During manufacturing the lens-fitted film unit 10, after having installed the IC memory 22 to the cartridge shell 16a of the film cartridge 16, the film cartridge 16 with a filmstrip 17 is loaded in the lens-fitted film unit 10. The battery 35 is installed into the lens-fitted film unit 10 and electrically connected to the electric flash circuit 229 and the write control IC 231. The write control IC 231 is powered and actuated to generate a clock on a fixed frequency through the oscillation circuit 94 and send it to the second-pulse generation circuit 201. The second-pulse generation circuit 201 generates a second-pulse per second and sends it to the hour-pulse generating circuit 202. The hour-pulse generating circuit 202 counts second-pulses to generate an hour-pulse at hourly intervals and sends it to the cumulative time counter 95 by which hour-pulses are counted to determine a cumulative time. Thereafter, the external computer 210 is connected to the circuit board 34 through the interface circuit (I/F) 210a to enter an initializing signal in the write control IC 231. As a result, the initializing circuit 204 of the write control IC 231 is actuated to initialize the IC memory 22 of the film cartridge 16 in the lens-fitted film unit 10 to make the IC memory 22 empty. Subsequently to initializing the IC memory 22, a reset signal "RST" is entered through the external computer 210 to initialize the second-pulse generating circuit 201, the hour-pulse generating circuit 202, the cumulative time counter 95 and the write control IC 231. Data on a date (year, the number of days, hours and seconds) at the time at which the reset signal "RST" is written as initial data in the IC memory 22 at the designated addresses (see Table II) with the precision of a second, and data on the maximum number of exposures available on the filmstrip 17 is written as the basic data in the IC memory 22. Since the initial data on a date is written with the precision of a second, a date and time of an exposure which is printed on a print has an error less than, for example, ±one hour. The second-pulse generating circuit 201 generates a second-pulse per second since reception of the reset signal "RST" and sends it to the hour-pulse generating circuit 202. The hour-pulse generating circuit 202 counts the second-pulses since reception of the reset signal "RST" to generate an hour-pulse at hourly intervals and send it to the cumulative time counter 95. The cumulative time counter 95 counts the hour-pulses as a cumulative time since reception of the reset signal "RST." The lens-fitted film unit 10 with the basic data written in the IC memory 22 is shipped after inspection and delivered to a customer.

When an exposure is made, the synchronous switch 27 is turned on irrespective of the necessity of a flash to provide a synchronizing signal "SYNC" which are sent to the write control IC 231, the write control circuit 96 and the electric flash circuit 229. When the main capacitor 28 has been charged up, the electric flash circuit 229 applies a trigger voltage to the discharge tube 253 and causes it to make a flash. As a result, the flash detection circuit 270 provides a flash detection signal "STB" and supplies it to the write control IC 231 for a fixed period of time. If the discharge tube 253 fails in making a flash, the flash detection circuit 270 doe not provide a flash detection signal "STB." When receiving the synchronizing signal "SYNC," the write control circuit 96 causes the voltage double circuit 91 to boost the source voltage VCC2 to a driving voltage VDD and applies it to the IC memory 22, as a result of which the IC memory 22 is actuated to be ready for data writing. Discrimination data on presence or absence of the flash detection signal "STB" is latched in a short period of time after the reception of the synchronizing signal "SYNC." Further, the write control circuit 96 sends a latch signal to the parallel/serial (P/S) transformation circuit 97 so as to latch cumulative time data at that instant in the parallel/serial (P/S) transformation circuit 97. Thereafter, the write control circuit 96 starts supplying a synchronizing clock (SCL). The parallel/serial (P/S) transformation circuit 97 transforms the cumulative time data into serial data in synchronism with the synchronizing clock (SCL) and sends the serial cumulative time data to the IC memory 22. The serial cumulative time data is written in the IC memory 22 at a designated address assigned to the exposure. As was previously described, since the serial cumulative time data is written in hour, the cumulative time data spares only a small capacity of the Memory IC 22. After the parallel/serial (P/S) transformation circuit 97 has sent the complete cumulative time data to the IC memory 22, the write control circuit 96 transfers the discrimination data into the parallel/serial (P/S) transformation circuit 97 and then resumes supplying a synchronizing clock (SCL). The parallel/serial (P/S) transformation circuit 97 transforms the discrimination data into serial data in synchronism with the synchronizing clock (SCL) and sends the serial discrimination data to the IC memory 22. The serial discrimination data is written in the IC memory 22 at a designated address assigned to the exposure. In this manner, the cumulative time data and the discrimination data on whether a flash exposure has been made or not are written in the IC memory 22. Following completion of writing the discrimination data, the write control circuit 96 makes the voltage double circuit 91 inactive so as to save the electric power of the battery 35. Cumulative time data and discrimination data are written in the IC memory 22 in the same manner as described above whenever an exposure is made.

When the maximum number of exposures available on the filmstrip 17 are exposed and the filmstrip 17 is completely rewound into the film cartridge 16, the lens-fitted film unit 10 is given to a photofinisher where the lens-fitted film unit 10 is processed as previously described.

It is to be understood that the present invention may be embodied with various changes, modifications and improvements, which may occur to those skilled in the art, without departing from the spirit and scope of the invention defined in the following claims.

What is claimed is:

1. A lens-fitted film unit which has an exposure mechanism and a built-in electric flash unit and is pre-loaded with a film cartridge, said lens-fitted film unit comprising:

an IC memory installed in one of said lens-fitted film unit and said film cartridge for storing exposure data;

write control IC means for controlling writing said exposure data in said IC memory; and switch means for causing said write control IC means to write said exposure data in said IC memory when said switch means is actuated by said exposure mechanism during making an exposure;

wherein said switch means comprises a synchronizing switch which is actuated by a shutter blade of said exposure mechanism to cause said built-in electric flash unit so as to make a flash and an auxiliary switch which is actuated by operation of said shutter mechanism, and said write control IC means is actuated to control writing said exposure data in said IC memory when at least one of said synchronized switch and said auxiliary switch is actuated.

2. A lens-fitted film unit which has an exposure mechanism and a built-in electric flash unit and is pre-loaded with a film cartridge, said lens-fitted film unit comprising:

a battery;

a capacitor connected to the electric flash unit to store an electrical charge from the battery for the electric flash unit;

a charge switch connected to the built-in electric flash unit, the charge switch being constructed so that when the switch is turned on the capacitor of said built-in electric flash unit is charged, said charge switch remaining turned on until manually turned off;

an IC memory installed in one of said lens-fitted film unit and said film cartridge for storing exposure data;

write control IC means for controlling writing said exposure data in said IC memory, said write control IC means having a charge control terminal connected to said built-in electric flash unit and being changeable between an interruption state in which charging said capacitor is interrupted and a permission state in which charging said capacitor is permitted, said write control IC also comprising a timer circuit operative in response to turning on said charge switch to count a time elapsed from said charge switch being turned on;

switch means for causing said write control IC means to write said exposure data in said IC memory when said switch means is actuated by said exposure mechanism during making an exposure;

wherein said write control IC means sets said charge control terminal to said interruption state when said timer circuit counts up a predetermined time from the charge switch being turned on.

3. The lens-fitted film unit of claim 2, wherein the write control IC means is constructed so that the charge control terminal can be set back to the permission state by turning the charge switch off and than back on.

4. The lens-fitted film unit of claim 3, wherein the predetermined time is set so that a capacity of the battery is sufficient to provide power for flash operation in connection with every available exposure in the film cartridge in addition to allowing the charge switch to be left on for the predetermined time several times.

5. The lens-fitted film unit of claim 4, wherein the predetermined time is approximately one hour.

* * * * *